United States Patent
Price

(10) Patent No.: US 9,267,710 B2
(45) Date of Patent: Feb. 23, 2016

(54) SOLAR THERMAL COLLECTORS AND THIN PLATE HEAT EXCHANGERS FOR SOLAR APPLICATIONS

(71) Applicant: SOLIGHT SOLAR, INC., Fairfield, IA (US)

(72) Inventor: Joel Leigh Price, Fairfield, IA (US)

(73) Assignee: Solight Solar, Inc., Fairfield, IA (US)

( * ) Notice: Subject to any disclaimer, the term of this patent is extended or adjusted under 35 U.S.C. 154(b) by 371 days.

(21) Appl. No.: 13/833,448

(22) Filed: Mar. 15, 2013

(65) Prior Publication Data

US 2013/0276773 A1 Oct. 24, 2013

Related U.S. Application Data

(60) Provisional application No. 61/625,728, filed on Apr. 18, 2012, provisional application No. 61/713,839, filed on Oct. 15, 2012.

(51) Int. Cl.
*F24J 2/30* (2006.01)
*F24J 2/34* (2006.01)
(Continued)

(52) U.S. Cl.
CPC .... *F24J 2/30* (2013.01); *F24J 2/20* (2013.01); *F24J 2/201* (2013.01); *F24J 2/28* (2013.01);
(Continued)

(58) Field of Classification Search
CPC ............... F24J 2/30; F24J 2/20; F24J 2/201; F24J 2/28; F24J 2/4647; F24J 2/465; F24J 2/506; F24J 2/507; F24J 2/345; F28F 3/083; F28F 13/003; F28F 13/12; F24D 2200/14; F24D 17/0021; Y02E 10/44; Y02B 10/20
See application file for complete search history.

(56) References Cited

U.S. PATENT DOCUMENTS 3,943,911 A 3/1976 Yu
4,015,582 A * 4/1977 Liu et al. ........................ 126/595
(Continued)

FOREIGN PATENT DOCUMENTS

EP 2652414 6/2012
JP 09-217961 8/1997
(Continued)

OTHER PUBLICATIONS

International Search Report and Written Opinion from co-pending PCT Application No. PCT/US2013/036873 filed Apr. 17, 2013 which claims priority to the instant application dated Jul. 22, 2013; 14 pages.
(Continued)

*Primary Examiner* — Alfred Basichas
(74) *Attorney, Agent, or Firm* — Harness, Dickey & Pierce, P.L.C.

(57) ABSTRACT

According to various aspects, exemplary embodiments are disclosed of solar thermal collectors, solar heating systems, and thin plate heat exchangers and absorbers. The thin plate heat exchangers and absorbers may be used for solar applications and/or non-solar applications. In an exemplary embodiment, a solar thermal collector generally includes a first layer comprising polymer and configured to allow sunlight to pass therethrough. A second layer comprises polymer and is configured to absorb thermal energy from sunlight. The second layer includes edges heat sealed to edges of the first layer. A permeable core is disposed between the first and second layers. In operation, a heat transfer fluid may flow through the permeable core and directly contact the second layer, whereby thermal energy is transferrable from the permeable core and the second layer to the heat transfer fluid.

20 Claims, 11 Drawing Sheets

(51) Int. Cl.
*F24J 2/20* (2006.01)
*F24J 2/28* (2006.01)
*F24J 2/46* (2006.01)
*F24J 2/50* (2006.01)
*F28F 3/08* (2006.01)
*F28F 13/00* (2006.01)
*F28F 13/12* (2006.01)
*F24D 17/00* (2006.01)

(52) U.S. Cl.
CPC *F24J 2/345* (2013.01); *F24J 2/465* (2013.01); *F24J 2/4647* (2013.01); *F24J 2/506* (2013.01); *F24J 2/507* (2013.01); *F28F 3/083* (2013.01); *F28F 13/003* (2013.01); *F28F 13/12* (2013.01); *F24D 17/0021* (2013.01); *F24D 2200/14* (2013.01); *F24J 2002/502* (2013.01); *Y02B 10/20* (2013.01); *Y02E 10/44* (2013.01)

(56) References Cited

U.S. PATENT DOCUMENTS

| | | | |
|---|---|---|---|
| 4,063,547 A | 12/1977 | Gruettner | |
| 4,078,548 A | 3/1978 | Kapany | |
| 4,136,672 A | 1/1979 | Hallanger | |
| 4,257,396 A | 3/1981 | Reinert | |
| 4,297,989 A | 11/1981 | Wozny et al. | |
| 4,299,200 A | 11/1981 | Spencer | |
| 4,320,743 A | 3/1982 | Allen | |
| 4,331,503 A | 5/1982 | Benjamin | |
| 4,344,416 A | 8/1982 | Kemper | |
| 4,356,815 A | 11/1982 | Spanoudis | |
| 4,392,481 A | 7/1983 | Moore | |
| 4,396,007 A | 8/1983 | Siemiller | |
| 4,404,958 A | 9/1983 | Boettcher | |
| 4,406,278 A | 9/1983 | Demmer | |
| 4,455,999 A | 6/1984 | Heckenbleikner | |
| 4,474,172 A | 10/1984 | Burke | |
| 4,490,204 A | 12/1984 | Benfield | |
| 4,512,333 A | 4/1985 | King | |
| 4,611,576 A | 9/1986 | Stephens et al. | |
| 4,672,949 A | 6/1987 | O'Neill | |
| 4,719,903 A | 1/1988 | Powell | |
| 5,313,933 A | 5/1994 | Gocze | |
| 5,524,381 A * | 6/1996 | Chahroudi | 47/17 |
| 6,082,354 A | 7/2000 | Rekstad | |
| 6,513,518 B1 | 2/2003 | Girerd | |
| 8,338,694 B2 | 12/2012 | Hoffman | |
| 8,371,287 B2 | 2/2013 | Fleischmann | |
| 8,381,717 B2 | 2/2013 | Bueller | |
| 8,697,981 B2 | 4/2014 | Adriana et al. | |
| 8,802,479 B2 | 8/2014 | Pearce et al. | |
| 8,985,097 B2 | 3/2015 | Swift et al. | |
| 9,040,808 B2 | 5/2015 | Morgan et al. | |
| 2004/0055631 A1 | 3/2004 | Szymocha et al. | |
| 2008/0011289 A1 | 1/2008 | Sichanugrist et al. | |
| 2009/0084430 A1 | 4/2009 | Intrieri et al. | |
| 2011/0047869 A1 | 3/2011 | Griessen et al. | |
| 2011/0186109 A1 | 8/2011 | Elazari | |
| 2012/0145223 A1 | 6/2012 | Weekley | |
| 2012/0152319 A1 | 6/2012 | Bailey | |
| 2013/0160821 A1 | 6/2013 | Dag | |

FOREIGN PATENT DOCUMENTS

| | | |
|---|---|---|
| JP | 2008-020179 | 1/2008 |
| WO | WO 2010/013028 | 2/2010 |

OTHER PUBLICATIONS http://bluenews_blueenergy.blogspot.hu/2012_02_01_archive.html; Feb. 2, 2012; 10 pgs. Specifically, pp. 4-5 and 8 relating to solar thermal collector.
http://creativehomemadethings.com/diy-solar-water-heater.html; Sep. 20, 2012; 3 pgs.
www.extension.purdue.edu/extmedia/ae/AE-88.html; Solar Heating for Home, Farm and Small Business: Basic Facts About Collection, Storage and Utilization; printed Jul. 2, 2015; 21 pages.
www.sundrumsolar.com/commercial-solutions.html; printed Jun. 22, 2015; 2 pages.
www.solimpeks.com/pv-t-hybrid-solar-collectors/; PV-T Hybrid Solar Collectors; Copyright 2012; 2 pages.
www.platinum-homes.com/ultra-energy-efficient-homes/solar-pv-and-thermal.htm; Platinum Homes; copyright 2012; 2 pages.
www.renewableenergyfocus.com/view/10922/solar-pv-and-thermal-a-marriage-made-. . . ; Copyright 2015, 5 pages.

* cited by examiner

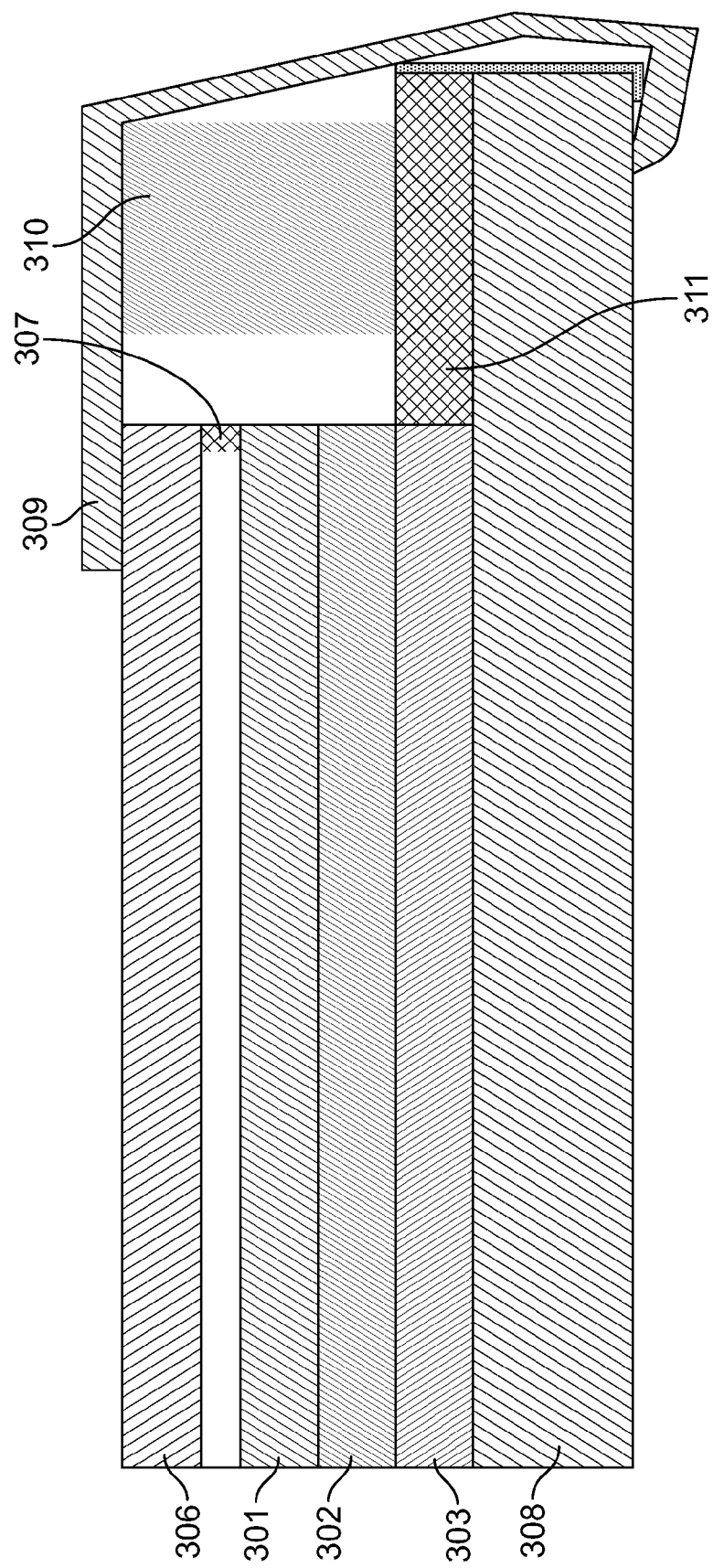

SOLAR THERMAL COLLECTORS AND THIN PLATE HEAT EXCHANGERS FOR SOLAR APPLICATIONS

CROSS-REFERENCE TO RELATED APPLICATIONS

This application claims the benefit of U.S. Provisional Application No. 61/625,728 filed Apr. 18, 2012, and U.S. Provisional Application No. 61/713,839 filed Oct. 15, 2012. The entire disclosures of the above applications are incorporated herein by reference.

FIELD

The present disclosure generally relates to solar thermal collectors, solar heating systems, and thin plate heat exchangers and absorbers. The thin plate heat exchangers and absorbers may be used for solar applications and/or non-solar applications.

BACKGROUND

This section provides background information related to the present disclosure which is not necessarily prior art.

Hot water is used in various ways within households. Domestically, water is commonly heated within tanks via natural gas water heaters. Typical domestic uses of hot water include cooking, bathing, cleaning (e.g., laundry, dishwashing, etc.). Heated water is often used in swimming pools and hot tubs too.

SUMMARY

This section provides a general summary of the disclosure, and is not a comprehensive disclosure of its full scope or all of its features.

According to various aspects, exemplary embodiments are disclosed of solar thermal collectors, solar heating systems, and thin plate heat exchangers and absorbers. The thin plate heat exchangers and absorbers may be used for solar applications and/or non-solar applications.

In an exemplary embodiment, a solar thermal collector generally includes a first layer comprising polymer and configured to allow sunlight to pass therethrough. A second layer comprises polymer and is configured to absorb thermal energy from sunlight. The second layer includes edges heat sealed to edges of the first layer. A permeable core is disposed between the first and second layers. In operation, a heat transfer fluid may flow through the permeable core and directly contact the second layer, whereby thermal energy is transferrable from the permeable core and the second layer to the heat transfer fluid.

In another exemplary embodiment, a heat exchanger generally includes a top plate, a bottom plate, and a frame defined by the top and bottom plates. The top plate includes a plurality of ports for allowing first and second heat transfer mediums to enter and exit the heat exchanger. The frame houses first and second heat exchanger plates and first and second sets of permeable layers. The first and second sets of permeable layers are operable for supporting and separating the plates and creating flow paths therebetween for the first and second heat transfer mediums such that thermal energy may be transferred from the first heat transfer medium through the first and second heat exchanger plates to the second heat transfer medium without intermixing of the first and second heat transfer mediums.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 10 is a side view of a solar thermal collector that includes glazing and a flap attached to the glazing according to another exemplary embodiment;

DETAILED DESCRIPTION

Figure 1:
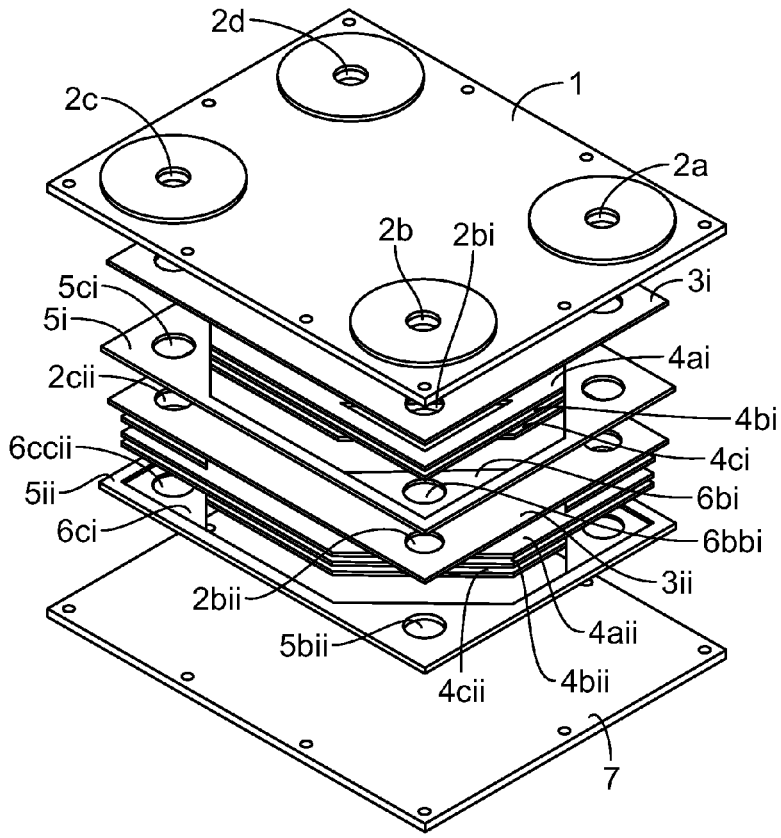
FIG. 1 is an exploded perspective view of a heat exchanger according to an exemplary embodiment.

Example embodiments will now be described more fully with reference to the accompanying drawings.

The inventor hereof has developed and discloses herein exemplary embodiments of thin plate heat exchangers and absorbers that may be used for solar applications including solar water (or other fluid) heaters, water purification devices, etc. The thin plate heat exchangers and absorbers may also be used in other applications, including other solar applications as well as non-solar applications. Also disclosed herein are exemplary embodiments of solar thermal collectors that collect heat by absorbing sunlight and solar heating systems (e.g., solar water heaters, etc.).

In an exemplary embodiment, a solar thermal collector comprises heat sealed film that may be cut to size from rolls of the film. In this example, the solar thermal collector generally includes a transparent film outer envelope with a dark colored mesh internal layer that provides flow turbulence to aide in heating the water or other heat transfer fluid. The solar thermal collector may also include inlet and outlet fittings, one or more glazing layers, and a heat absorbing surface directly in contact with the fluid flow for better heat transfer from the heat absorbing surface to the fluid.

Some exemplary embodiments include an all polymer solar thermal collector that is lightweight and foldable due to its polymer material selection and design. By way of example, a foldable polymer solar thermal collector may be unfolded and used to heat or pre-heat potable water and then folded into a compact configuration for storage, shipping, or transport.

Some exemplary embodiments include devices that may be operable and used as heat exchangers or heat absorbers. A heat exchanger allows thermal energy transfer from one medium to another without any intermixing of the two mediums. An absorber absorbs thermal energy from a heat source such as the Sun or a hot pipe, and then transfers the absorbed thermal energy to a heat transfer medium. The devices disclosed herein may be used with a wide range of heat transfer mediums, including liquid heat transfers such as for a hot aqueous source that is to be cooled by a cold water source.

In exemplary embodiments, there is a heat exchanger of the plate type. The heat exchanger includes one or more plate walls that may be very thin, e.g., having a thickness of less than 0.02 centimeters, etc. This, in turn, can provide the advantage of higher thermal conductance through the thin plate walls. In preferred embodiments, the plate walls are made of polymer, such as high-density polyethylene (HDPE), biaxially-oriented polyethylene terephthalate (boPET), polytetrafluoroethylene (PTFE), among other suitable polymers, etc. When compared with metal plates, polymer plates have the advantage of being light in weight, less expensive per pound, and can be more resistant to certain chemicals and fouling. Despite these possible advantages, other exemplary embodiments include a heat exchanger having thin metal plates as the use of the metal plates in order to obtain the advantage of higher thermal conductivity.

When used as a heat exchanger, an exemplary embodiment of the device may operate or work in the following way. A first medium enters the device and is in contact with the plate walls of the device. A second medium is also in contact with the plate walls. The plate walls separate the first medium from the second medium. Due to the differential in temperature between the first and second mediums, heat is transferred through the plate walls from one medium to the other medium.

When used as a heat absorber, an exemplary embodiment of the device may operate or work in the following way. A heat transfer medium enters the device and is in contact with the plate walls. Heat energy then passes through the plate wall in the form of solar radiation or by direct contact and conduction from a source with a temperature differential from the heat transfer medium. The heat transfer medium carries this heat energy away.

The inventor hereof has developed and discloses unique and novel systems and methods for supporting and separating thin plate walls and creating a flow path for heat exchange or transfer medium(s) between the plate walls. In exemplary embodiments, plate walls are separated by a mesh, netting, matrix, or other separation means that allows a medium to pass therethrough. The separation means may comprise any of a wide range of suitable materials such as a material that is reticulated, net like, mesh, woven, open cell foam, metal wool, or the like.

In a preferred exemplary embodiment of the absorber, the separation means or mesh is made of multiple layers of PTFE coated fiberglass mesh. In this example, the mesh allows the medium to pass through it and also creates turbulence in the medium, which turbulence can be advantageous for improved heat transfer.

The mesh is preferably configured such that it is not overly fine and/or too dense to cause the mesh to block a large degree, e.g., majority, of the medium from contacting the plate walls. Instead, the mesh is preferably configured to create a large path for the transfer medium to flow while also allowing the transfer medium to contact the plate walls. In operation, the mesh does not compress to such a large degree that the mesh closes off the medium flow when subjected to the pressure of the transfer medium. In a preferred exemplary embodiment, the mesh comprises multiple layers of netting and is able to withstand great pressure and still maintain flow channels. In other exemplary embodiments, open cell foam may be used such as in low pressure situations but it might be too compressible and completely compress in very high pressure situations. The use of netting may also have the advantage that the netting is not subject to significant compression set.

In addition to separating the plate walls, the mesh also serves to support the thin plate walls against the pressure from the transfer medium to prevent rupture or ballooning of the plate wall material. If the mesh that is used has a grain or parallel areas of greater thicknesses, the mesh may be arranged such that its pattern is arranged in such a way so as to help direct the flow of the transfer medium.

Various exemplary embodiments of a heat exchanger with the above-described plate type configuration will now be described. In a first exemplary embodiment, a heat exchanger is a plate and frame type with gaskets. In this first exemplary embodiment, there are gaskets on or along the edges of the plates to prevent or at least inhibit the transfer medium from escaping out or along the edges. The plates with the gaskets thereon are housed or supported in a frame. This plate and frame heat exchanger includes the thin plate/wall(s) and mesh described above.

In a second exemplary embodiment, a heat exchanger may be analogous or similar to a brazed heat exchanger. In this second exemplary embodiment, the edges of the plate wall are attached preferably by heat sealing, etc. In this second embodiment, the pressures created by the heat transfer medium would have the effect of pushing out on the plate walls which, as they are thin, might not be able to withstand high pressure. For this reason, this second exemplary embodiment preferably has a suction pump pulling the heat transfer medium through the heat exchanger, such that the heat exchanger would not be subject to bursting.

Also in this second exemplary embodiment, the supporting mesh prevents the plate walls from collapsing against each other and, thereby helps to maintain a flow channel for the heat transfer medium. The pressure of the walls on the mesh also has the effect of spreading out the heat transfer medium to create an even, not channelized, flow within the space between the plate walls. In a variation of this second embodiment, gaskets may also be interleaved between the plates to create more suitable spacing between the plate walls to allow attachment or heat sealing. The gaskets in this variation are preferably heat sealable to the plate walls.

A third exemplary embodiment includes a front plate wall and a rear plate wall. The mesh described herein is disposed or positioned between the front and rear plate walls. This, in turn, creates essentially a single plate heat exchanger. This third exemplary embodiment is similar to the second exemplary embodiment described above (brazed analog), but with only one heat transfer medium passing through it. The plate may be surrounded by or immersed in a second heat transfer medium. This would be useful, for example, for cooling or heating a tank of liquid. Alternatively, this third exemplary embodiment may instead be used as a thermal absorber. In which case, the single plate may be wrapped around a pipe or container to be heated or cooled.

Also disclosed herein are exemplary embodiments of hot liquid, preferably water, solar absorbers or solar thermal collectors for medium and low temperature uses (e.g., domestic hot-water, swimming pools, etc.). Such exemplary embodiments may be more efficient at collecting solar radiation than other glazed or unglazed collectors, lightweight, inexpensive to assemble, made of inexpensive materials relative to current commercial designs, durable, environmentally friendly in the small amount of total material used in construction, freeze protected, use materials approved for potable water, easy to package, easy to ship, and/or easy to install.

A solar thermal collector works in the following way. Sunlight penetrates the glazing, then penetrates the clear collector outer film, and strikes the inner portion of the absorber. The inner portion of the absorber comprises a solar absorbing (e.g., non-reflective, opaque and/or black mesh, etc.) core and a solar absorbing (e.g., preferably opaque and/or black, etc.) inner thin film. Water may be pulled, e.g., preferably by a suction pump, through the collector to draw away the thermal energy. The mesh core prevents or at least inhibits the inner and outer films from collapsing together under suction, and thus provides a broad, but thin, channel for the water to flow. The mesh core also creates turbulence in the water to aid in heat removal from the inner absorber surfaces.

Because the outer film is in direct contact, with some pressure, either with the mesh or water, there is less or no condensation buildup to block or reflect the incoming sunlight. Accordingly, this exemplary configuration or design has efficiency advantages in that solar radiation penetrates into the collector to the absorber, which is in immediate contact with water. Thus, the low thermal conductivity of the absorber is not an issue because all thermal transference is conducted on the surface where the solar radiation is immediately striking the absorber and directly transferred to the water. This exemplary configuration or design also lowers re-radiation of the solar energy in the form of infrared radiation because the entire collector is kept cool. This is different from current commercial designs where the solar energy heats an outer layer that then will radiate back out some of the heat generated.

Also with the inventor's exemplary embodiment of a solar thermal collector, the upper and lower layers of the collector's absorber acts as an insulator adding to overall efficiency. The exemplary configuration or design also has manufacturing advantages in that the edges or near edges of the glazing, inner layer, and outer layer can be sealed together using established and reliable techniques, such as heat sealing. This sealing of the edges effectively creates a long, three-layer tube of materials that may then be cut perpendicular to the long length of the tube to a desired collector size.

The need to create space between the glazing layer and the outer layer may be accommodated by attaching (e.g., preferably by heat sealing, etc.) a flap, strips, or a full length of material of the same composition as the glazing material to the glazing layer. The edge of the flap may be attached to the glazing layer parallel to the opening created when the tube of the three layers is cut. The edge of the flap would ideally be attached a short distance, e.g., an approximate distance equal to the desired gap. The flap serves to pull the glazing layer away from the outer layer. In a preferred exemplary embodiment, the edges of the glazing, outer layer, and inner layer are sealed together such that there is a portion of their lengths that is penetrable without compromising the tube created by the sealing together of the glazing and inner and outer layers. This may be accomplished by the seal attaching the layers being located approximately two inches toward the center from the edge or the seal being approximately two inches wide. This would allow the edges of the tube to be wrapped around the insulation board and attached to the board by means such as a screw that would penetrate the layers without compromising the integrity of the created tube. Alternately, one or more layers, any combination of or single layer of glazing, outer layer and inner layer may be cut wider than the others to accommodate wrapping around the insulation board. In this case, the seal is made at the edge of the narrower layer(s) and the wider layer(s) are wrapped around the insulation board.

A collector disclosed herein may be cut into designs, such as circles, wave shapes, etc. for a decorative or aesthetic effect. The edges of the glazing, outer, and inner layers may be sealed together as in a more standard rectangular arrangement. The insulation board may also be cut in the same pattern.

Advantages for this exemplary embodiment of a solar thermal collector may include allowing a simpler system to supply water to the collectors and distribute the heated water to its destination. Additional advantages may also be realized or associated with a solar thermal collector according to an exemplary embodiment disclosed herein. For example, a non-pressurized holding tank for the heated water may be used. Water to the collectors may be circulated from a non-pressurized holding tank. This allows any increase in pressure from the collectors or lines to be released in the holding tank. This accommodates the case of the collectors getting so hot that they reach the boiling point of the heat transfer fluid. Any air entering the system may also be pumped out into the tanks and released into the air with this arrangement.

The fact that the collectors are freeze burst resistant allows potable water to be circulated through the collectors. The potable water may then be directly pumped or drawn from the holding tank(s) eliminating the need for heat exchangers. A solar thermal collector made in this exemplary manner would be relatively light. The light weight allows the solar thermal collector to be mounted vertically on a wall without reinforcement of the wall. A solar thermal collector as described herein may also be directly attached to a wall using screws or other hardware without the need for an additional frame. To increase the angle from the wall from vertical, supports may be placed below the solar thermal collector to hold the solar thermal collector up and away from the wall at the bottom while the top was attached to the wall directly.

With reference now to the figures, FIG. 1 illustrates an exemplary embodiment of a heat exchanger embodying one or more aspects of the present disclosure. In this exemplary embodiment, the heat exchanger includes heat exchanger plates comprising plate walls, mesh layers, and gaskets. Accordingly, the heat exchanger may also be referred to herein as a plate and gasket type of heat exchanger.

As shown in FIG. 1, the heat exchanger includes a top rigid frame plate 1 and bottom plate 7. The top frame plate 1 includes four ports or openings 2a, 2b, 2c, and 2d. As explained below, first and second heat transfer mediums respectively enter the heat exchanger via the respective ports 2b and 2c, which may thus also be referred to as inlets. Also explained below, the first and second heat transfer mediums respectively exit the heat exchanger via the respective ports 2d and 2a, which may thus also be referred to as outlets.

With continued reference to FIG. 1, the top frame plate 1, the bottom plate 7, and securing mechanisms (e.g., bolts and guiding bars, etc.) constitute or define the frame of the heat exchanger. The frame of the heat exchanger houses a plurality of heat exchanger plates. In this exemplary embodiment, the frame houses a plate wall 3i, mesh layers 4ai, 4bi, and 4ci and 4aii, 4bii, and 4cii, a main gasket 5i, two flow control gaskets 6bi, and a second flow control gasket (not shown in FIG. 1).

For this exemplary embodiment shown in FIG. 1, the heat exchanger may work in the following exemplary way. A first heat exchange medium enters inlet port 2b, which first heat exchange medium is hot, preheated (e.g., heated by solar thermal energy, etc.), and/or at a higher temperature than a second heat exchange medium.

The first heat transfer medium then passes through opening 2bi in the plate wall 3i and moves through the channel created by mesh layers 4ai, 4bi, and 4ci to the opposite corner of the heat exchange plate wall 3ii. While moving along this path, the first medium is in contact with heat exchange plate wall 3ii such that heat is transferred from the first medium across the plate wall 3ii to a second heat transfer medium. This heat transfer occurs because the first heat exchange medium is at a higher temperature than the second heat exchange medium and plate wall 3ii. By way of example, the first and second heat exchange mediums may comprise water, sea water, oil, liquid organic chemicals, etc.

After traversing the diagonal length of plate wall 3i, a portion of the first medium would then travel toward the exit of the heat exchanger port 2d. A portion of the flow of the first medium after entering the heat exchanger at port 2b would travel through the opening 6bbi in flow control gasket 6bi, then through the opening 2bii in wall 3ii and on to the next heat exchanger plate. The first medium is prevented from entering the channel created by mesh 4aii, 4bii, and 4cii by the pressure applied by flow control gasket 6bi and gasket 5ii. As shown, mesh 4aii, 4bii, and 4cii are not between gasket 5ii and wall 3ii so the two surfaces can press against one another to prevent the first medium from traveling between them.

Flow control gasket 6bi provides an even surface to press against wall 3ii. The flow of the first medium would continue down the collector or heat exchanger with part of the flow travelling diagonally across the plates where its flow was not prevented and then back toward the exit or outlet port 2d. A part of the first medium also travels down the collector or heat exchanger until it reaches the last plate where what was left of the flow of the first medium would travel diagonally across that last plate and then toward exit port 2d.

The flow of the second heat exchange medium through the heat exchanger is similar to the flow of the first medium except the second medium travels across the plate surfaces that the first medium was not travelling across. In this exemplary way, the first and second mediums pass by each other flowing in opposite directions while remaining separated by the plate wall. In this type of flow construction, the second medium would enter through port opening 2c. The second medium is prevented from travelling through the channel created by mesh layers 4ai, 4bi, and 4ci by the top plate 1 pressing against gasket 5i.

The second medium travels through the opening 5ci in gasket 5i. The second medium then travels through opening 2cii in the wall 3ii. The second medium could then travel diagonally across and under plate wall 3ii within the channel created by mesh layers 4aii, 4bii, and 4cii or through the opening 6ccii in flow control gasket 6cii. After the second medium or a part thereof travels across the heat exchange plate 3ii, it then travels up through the openings in the plates and out exit port hole 2a.

Figure 2:
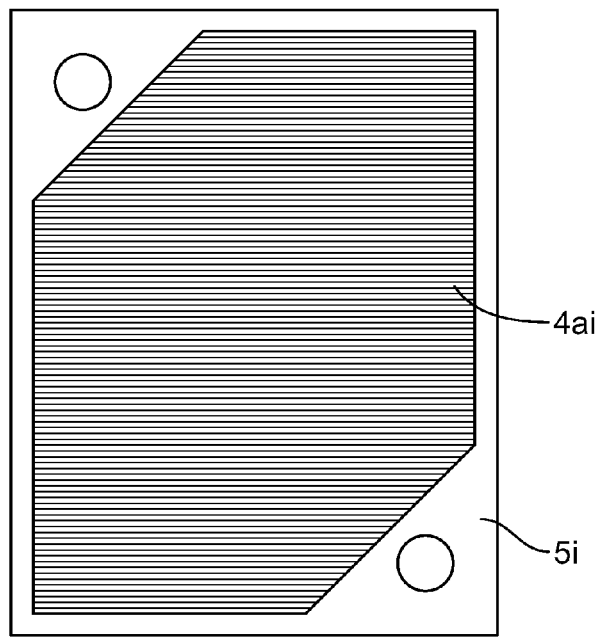
FIG. 2 is a top view of the first (upper) gasket and mesh set of the heat exchanger shown in FIG. 1.

To make the gaskets and plates fit properly against one another, the mesh layers 4ai, 4bi, and 4ci together are approximately the height of the gaskets 5i. FIG. 2 is a top view of the first (top) gasket 5i with the mesh set assembled thereto. In FIG. 2, only the top mesh layer 4ai can be seen because the other mesh layers 4bi and 4ci are under the mesh layer 4ai and hidden from view. The gasket 5i and mesh set constitutes a heat exchange plate without the plate wall. The mesh layers 4ai, 4bi, and 4ci fit within the center open space of the gasket 5i. The top mesh layer 4ai and the second layer 4bi extend over the flow control gaskets 5i.

Figure 3:
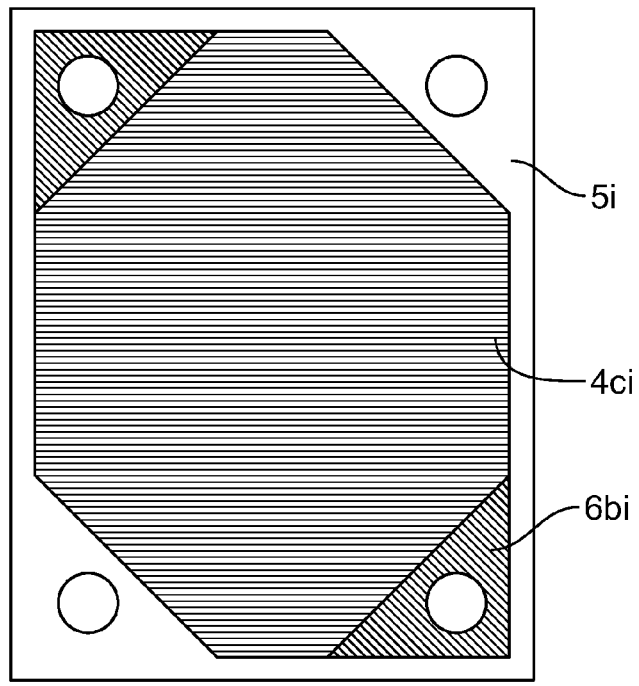
FIG. 3 is a bottom view of the first gasket and mesh set shown in FIG. 2.

FIG. 3 is a bottom view of the first (top) gasket 5i with the mesh set assembled thereto. In FIG. 3, only the bottom mesh layer 4ci can be seen. Bottom mesh layer 4ci does not extend over the flow control gasket 6bi, which may have a thickness approximating mesh layer 4ci so that the mesh layers and flow control gaskets 6bi together are approximately the same height as the gasket 5i.

As an alternative to the single flow control gasket 6bi arrangement shown in FIGS. 1 through 3, an alternative embodiment of a heat exchanger may instead include two gaskets. The two gaskets may preferably be made of a stiff material such as hard polymer or metal, etc. In this alternative embodiment, the two gaskets may be arranged so as to have a gap between them to allow the heat exchange material or medium to flow between the two gaskets. The outer surfaces of the two gaskets would provide a stiff surface to press against, and thereby prevent the heat exchange material or medium from flowing out of the pathways. The gap between the two flow control panels or gaskets may be created by mesh layers as described herein or by some other material that would maintain the gap under pressure.

Figure 4:
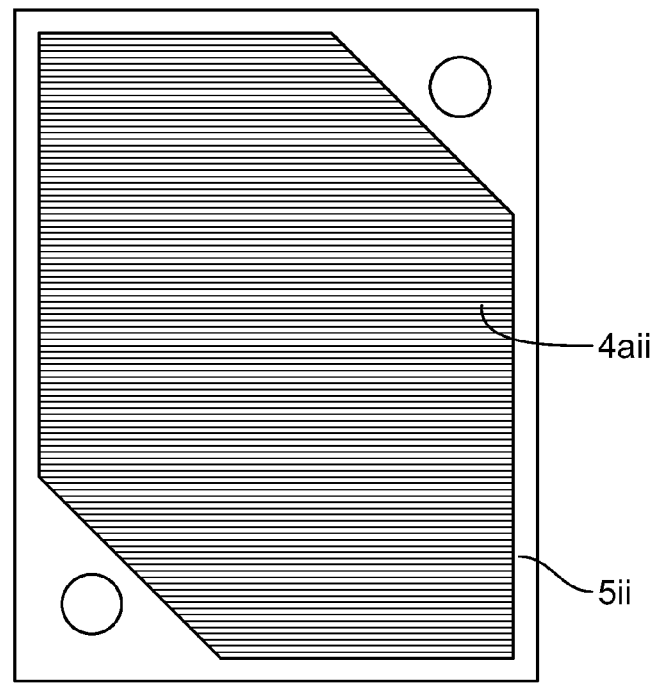
FIG. 4 is a top view of the second (lower) gasket and mesh set of the heat exchanger shown in FIG. 1, where the second gasket and mesh set are a mirror image of the first gasket and mesh set shown in FIG. 2.

FIG. 4 is a top view of the second (after top) gasket 5ii and mesh set shown in FIG. 1. In FIG. 4, only the top mesh layer 4aii can be seen because the other mesh layers 4bii and 4cii are under the mesh layer 4aii and hidden from view. The second gasket 5ii and mesh set also constitute a heat exchange plate without the plate wall. The mesh layers 4aii, 4bii, and 4cii fit within the center open space of the gasket 5ii. The top mesh layer 4aii and the second layer 4bii extend over the flow control gaskets 5ii. Generally, the second gasket 5ii and mesh set 4aii, 4bii, and 4cii are a mirror image of the first gasket 5i and mesh set 4ai, 4bi, and 4ci shown in FIG. 2.

Figure 5:
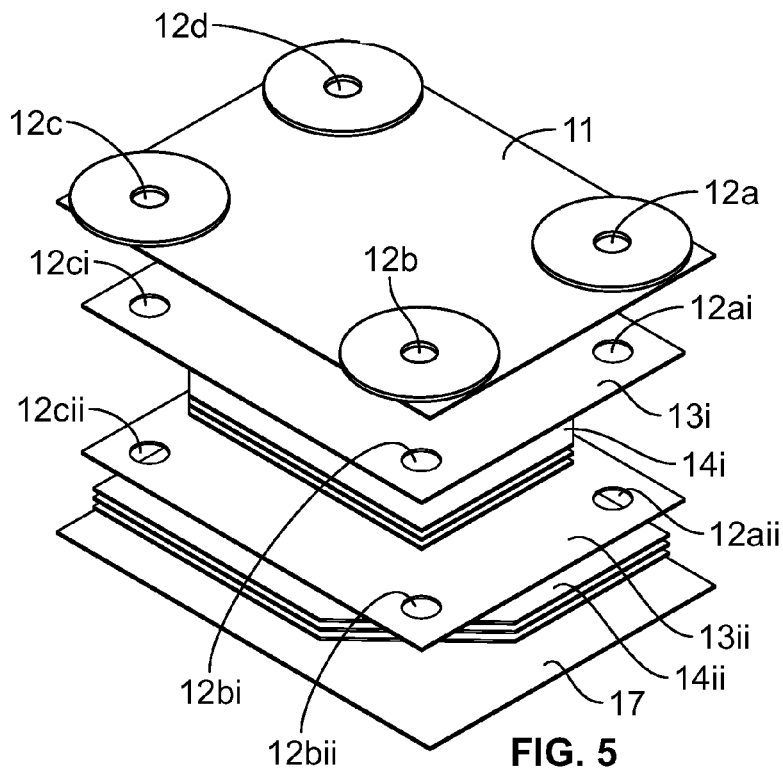
FIG. 5 is an exploded perspective view of a heat exchanger according to another exemplary embodiment.

FIG. 5 illustrates another exemplary embodiment of a heat exchanger embodying one or more aspects of the present disclosure. In this exemplary embodiment, the heat exchanger includes heat exchanger plates as disclosed herein. In this exemplary embodiment, openings of the plate walls are sealed to alternate adjacent plate walls so as to create a flow of heat transfer medium in which first and second heat transfer mediums flow over every other plate without intermingling. Accordingly, the heat exchanger may also be referred to herein as sealed type of heat exchanger.

As shown in FIG. 5, the heat exchanger includes a top frame film 11 and a bottom frame film 17, which may be made of flexible film. The top frame film 11 includes four ports or openings 12a, 12b, 12c, and 12d. As explained herein, first and second heat transfer mediums respectively enter the heat exchanger via the respective ports 12b and 12c, which may thus also be referred to as inlets. Also explained herein, the first and second heat transfer mediums respectively exit the heat exchanger via the respective ports 12d and 12a, which may thus also be referred to as outlets.

The heat exchanger also includes port mechanisms, which could be tank fittings, etc. The top frame film 11, the bottom film 17, and port mechanisms constitute or define the frame of the heat exchanger. The two frame films 11 and 17 serve to protect the thinner inner heat exchanger plates or plate walls 13i, 13ii. The two frame films 11, 17 may be made of thicker and/or tougher material than the inner heat exchange plate walls 13i, 13ii.

The frame of the heat exchanger houses a plurality of heat exchanger plates. In this exemplary embodiment, the frame houses a first plate wall 13i and first mesh set 14i comprising three mesh layers. The heat exchanger frame also houses a second plate wall 13ii and second mesh set 14ii also comprising three mesh layers.

The openings of the plate walls 13i and 13ii are sealed (e.g., heat sealed, etc.) to alternate adjacent plate walls. This creates a flow path for the heat transfer medium along which the first and second mediums flow over every other plate without intermingling or intermixing of the first and second mediums.

For this exemplary embodiment shown in FIG. 5, the heat exchanger may work in the following exemplary way. A first heat exchange medium enters port 12b, which first heat exchange medium is hot, preheated (e.g., heated by solar thermal energy, etc.), and/or at a higher temperature than a second heat exchange medium. The first and second mediums are prevented from contacting the top frame film 11 by means of the tank fittings encompassing the openings to the first plate wall or by sealing the frame film 11 to the plate wall 13i.

After entering through inlet port 12b, the first medium then passes through opening 12bi in plate wall 13i and moves through the channel created by mesh layers 14i to the opposite corner of the heat exchange plate 13i. While moving along this path, the first medium is in contact with heat exchange plate wall 13ii such that heat is transferred from the first medium across the plate wall 13ii to a second heat transfer medium. This heat transfer occurs because the first heat exchange medium is hot (e.g., heated by solar thermal energy, etc.) or at a higher temperature than the second heat exchange medium and plate wall 13ii.

After traversing the diagonal length of plate wall 13i, a portion of the first medium would travel toward the exit of the heat exchanger port 12d. A portion of the flow of the first medium after entering the heat exchanger at port 2b would travel through the opening 12bii in wall 13ii and on to the next heat exchanger plate. The first medium is prevented from entering the channel created by mesh layers 14ii by the seal, preferably a heat seal, between plate walls 13ii and the next plate. This seal extends around the opening 12bii at a sufficient distance to create a durable seal, but the seal does not extend the entire area of plate wall 13ii.

As shown, the mesh layers 14ii would not extend to the area around opening 12bii to allow a seal to be made. The flow of the first medium would continue down the collector or heat exchanger with part of the flow travelling diagonally across the plates where its flow was not prevented and then back toward the exit port 12d. A part of the first medium also travels down the collector or heat exchanger until it reaches the last plate where what was left of the flow of the first medium would travel diagonally across that last plate and then toward exit port 12d.

The flow of the second heat exchange medium through the heat exchanger is similar to the flow of the first medium except the second medium travels across the plate surfaces that the first medium was not travelling across. In this exemplary way, the first and second mediums pass by each other flowing in opposite directions while remaining separated by the plate wall. In this type of flow construction, the second medium would enter through port opening 12c. The second medium is prevented from travelling through the channel created by mesh layers 14i by the seal between plate walls 13i and 13ii and around openings 12ci and 12cii.

The second medium travels through opening 12cii in the wall 13ii. The second medium could then travel diagonally across and under plate wall 13ii within the channel created by mesh layers 14ii, or the second medium could travel through the opening in the next plate wall. After the second medium or a part thereof travels across the heat exchange plate, it then travels up through the openings in the plates and out exit port hole 12a.

Figure 6:
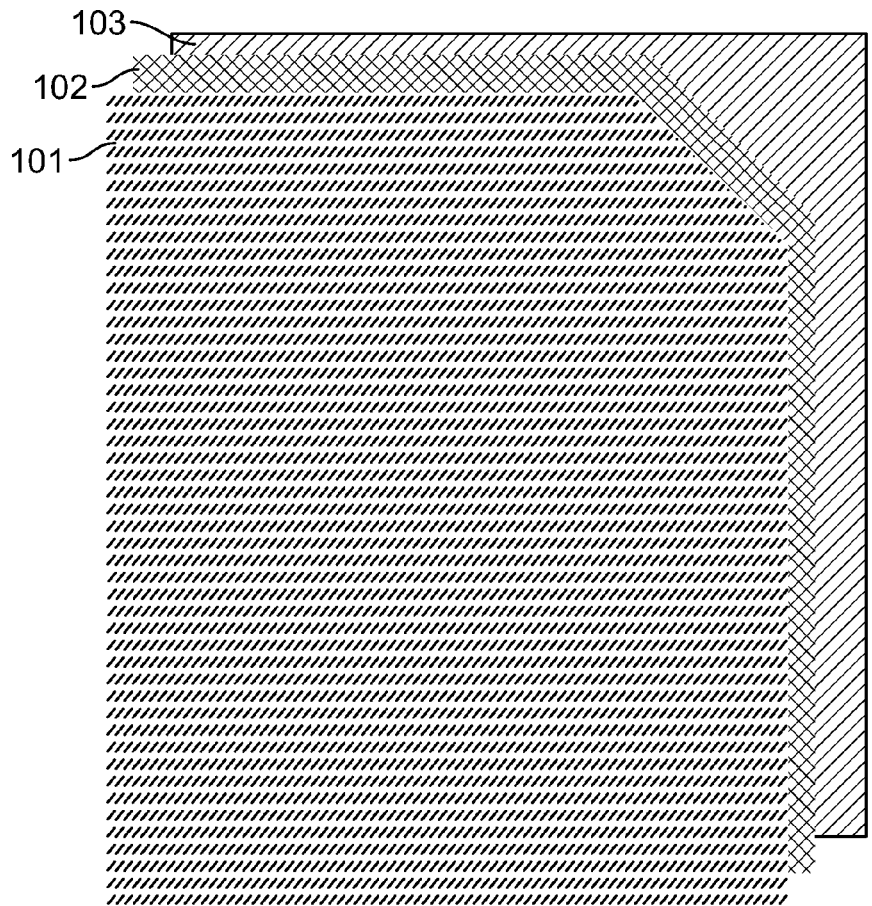
FIG. 6 is an exploded perspective view of a plate heat exchanger according to another exemplary embodiment.
Figure 7:
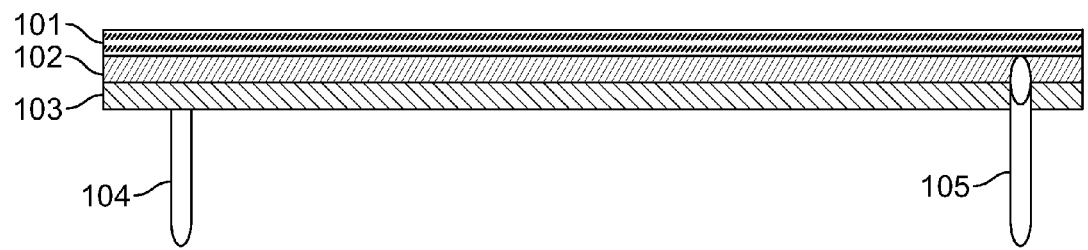
FIG. 7 is a side view of the heat exchanger shown in FIG. 6 after being assembled together and also showing inlet and outlet tubes.

FIGS. 6 and 7 illustrate another exemplary embodiment of a heat exchanger embodying one or more aspects of the present disclosure. In this exemplary embodiment, the heat exchanger includes an envelope, sack, pocket, or bag like structure surrounding mesh as previously described. The bag like structure and mesh may be considered a single heat exchange plate, and accordingly, the heat exchanger shown in FIGS. 6 and 7 may be referred to herein as a single plate heat exchanger.

In this exemplary embodiment, the heat exchanger employs a unique design of two thin outer coverings or layers 101 and 103 (e.g., preferably polymer film, etc.). The outer layers 101 and 103 are sealed together along all their perimeter edges (e.g., preferably heat sealed, etc.) to create an envelope, sack, pocket, or bag like structure. Mesh or other suitable material 102 is positioned within the bag like structure such that the bag generally surrounds the mesh 102. The mesh or other suitable material 102 may comprise a wide range of materials as disclosed herein, such as mesh, netting, matrix, reticulated, net like, mesh, woven, open cell foam, metal wool, multiple layers of PTFE coated fiberglass mesh, etc. The mesh or other suitable material 102 creates and/or helps maintain a cavity between the films or layers 101, 103, which, in turn, allows a heat transfer fluid or medium (e.g., water or other liquid, etc.) to flow between the films 101, 103.

FIG. 7 is a side view of the single plate heat exchanger shown in FIG. 1 after being assembled together and also showing an inlet 104 and an outlet 105. Suction may be applied preferably via a suction pump at the top of the heat exchanger through the outlet 105. The outlet 105 may preferably be a tube that penetrates into the bag cavity. The outlet tube 105 may be attached to the lower layer or heat exchanger wall 103 in such a way as to prevent the heat exchange or heat transfer medium (e.g., water, other fluid, etc.) from exiting the heat exchanger around the outlet tube 105. This may be accomplished by employing a tank fitting or other suitable means. In one exemplary configuration, the outlet tube 105 is attached to a manifold to aid in the even distribution of the heat exchange medium.

The heat exchange medium enters the cavity of the bag like structure through the inlet 104, which is also preferably a tube that penetrates into the bag cavity. The inlet tube 104 is located at the bottom of the heat exchanger. Again, a tank fitting and a manifold could be employed for the inlet tube 104.

The mesh 102 prevents the enclosing films 101, 103 from completely collapsing under the vacuum created by the suction pump or other means. Thus, the mesh 102 helps to maintain a cavity in which water or other suitable heat exchange fluid may flow through the mesh 102. The mesh 102 also creates turbulence in the heat exchange medium and so aids in heat transference.

The heat exchange medium is in contact with the heat exchanger walls 101 and 103 such that thermal energy can be transferred through the heat exchanger walls 101 and 103 to the surrounding medium. This exemplary embodiment of the heat exchanger may be constructed to a size that would be advantageous for wrapping around a pipe or drum to add or remove heat from that pipe or drum.

Figure 9:
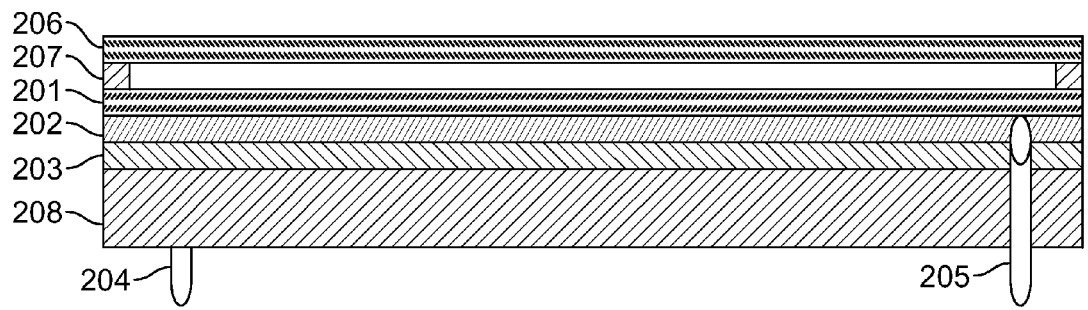
FIG. 9 is a cross-sectional view of the solar thermal collector shown in FIG. 8 after being assembled together and also showing inlet and outlet tubes.
Figure 8:
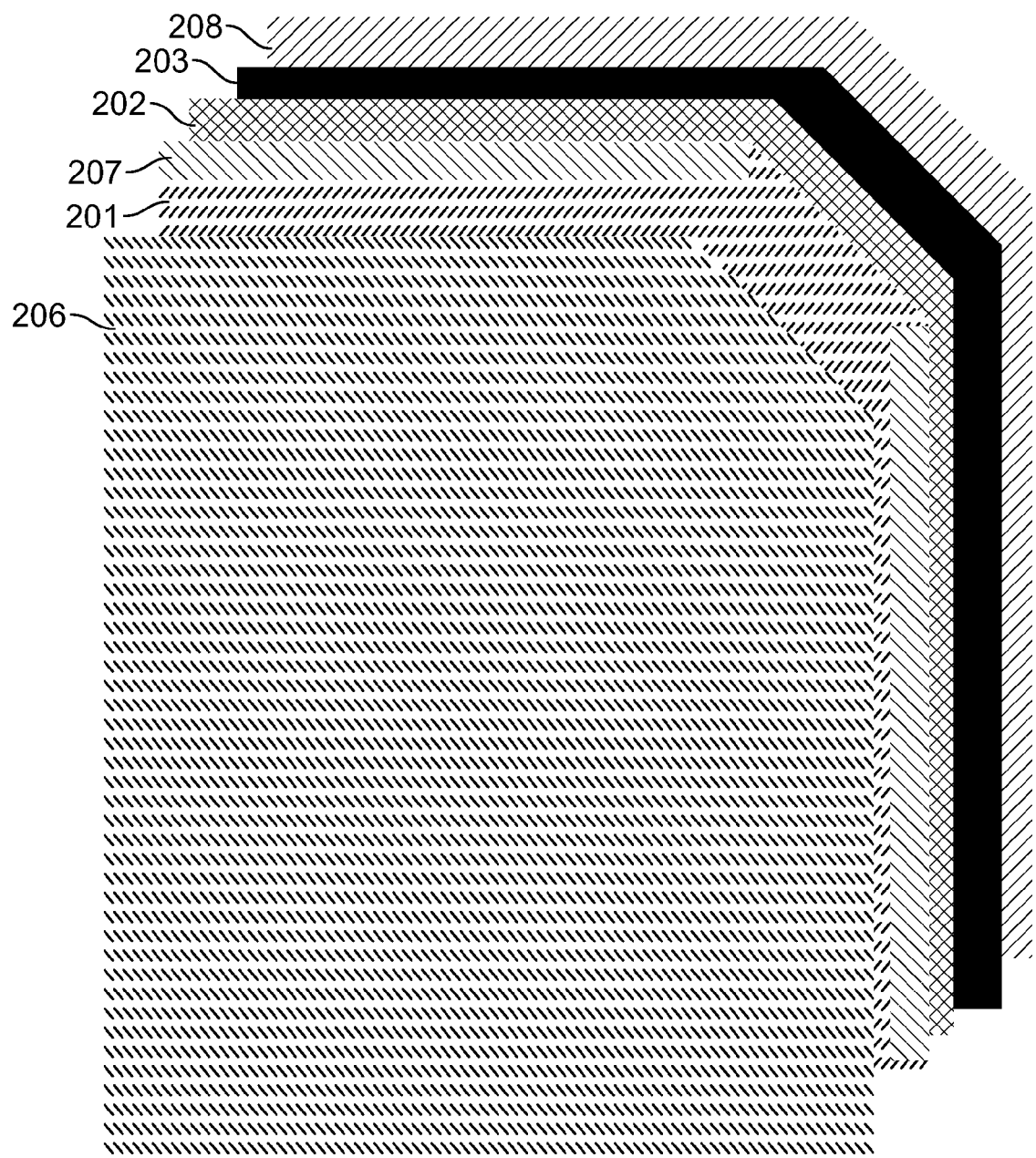
FIG. 8 is an exploded perspective view of a solar thermal collector according to an exemplary embodiment.

FIGS. 8 and 9 illustrate an exemplary embodiment of a solar thermal collector embodying one or more aspects of the present disclosure. In this exemplary embodiment, the solar thermal collector employs a unique design of two thin outer and inner (or first and second) layers 201 and 203. The outer layer 201 preferably comprises a thin-film polymer and is light transmissive, clear, or transparent to allow sunlight to pass therethrough. The inner layer 203 preferably comprise a thin-film polymer and is dark colored (e.g., black or other radiation absorbing color, etc.) or opaque so as to absorb heat from the sunlight passing through the outer light-transmissive layer 201.

The first, light-transmissive layer 201 and the second, heat-absorbing layer 203 are sealed together along all their perimeter edges (e.g., preferably heat sealed, etc.) to create a bag like structure that surrounds a permeable core 202. The permeable core 202 may comprise a preferably flexible material, such as several layers of coated fiberglass mesh, woven polymer netting, or open-cell flexible foam. The permeable core 202 creates a cavity between the films or layers 201, 203 to allow a liquid (e.g., water, etc.) to flow between the films 201, 203. The bag like structure formed by the layers 201, 203 and the permeable core 202 may be collectively referred to herein as an absorber.

With reference to FIG. 9, suction may be applied preferably via a suction pump at the top of the absorber through an outlet 205. The outlet 205 may preferably be a tube that penetrates into the bag cavity. The outlet tube 205 may be attached to the inner layer 203 in such a way as to prevent the heat transfer medium (e.g., water, other fluid, etc.) from exiting the collector around the outlet tube 205. This may be accomplished by employing a tank fitting or other suitable means. In a preferred exemplary embodiment, a tank fitting is heat sealed on two sides to create a permanent water tight seal. In an exemplary configuration, the outlet tube 205 is attached to a manifold to aid in the even distribution of the heat exchange medium.

Water or other heat transfer medium enters the cavity of the bag like structure through an inlet 204 located at the bottom of the absorber. The inlet 204 is also preferably a tube that penetrates into the bag cavity. Again, a tank fitting and a manifold could be employed on the inlet tube 204.

The permeable (e.g., mesh, etc.) core 202 prevents the enclosing films 201, 203 from completely collapsing under the slight vacuum created by the suction pump or other means. Thus, the permeable core 202 helps to maintain a cavity in which water or other suitable heat transfer medium may flow through the permeable core 202. Under a slight vacuum, the permeable core 202 with the outer film 203 serves to spread the flow of water out fairly evenly across its width. The permeable core 202 and the absorber inner film 203 transfer thermal energy obtained from the sunlight to the water flowing through the permeable core 202 and across the absorber inner film 203.

The solar thermal collector also includes an outer glazing 206 that is clear, transparent, light-transmissive, and/or substantially transparent. The clear outer glazing 206 may preferably comprise a thin-film polymer. The thin-film polymer may be affixed (e.g., preferably by heat-seal, etc.) to the absorber. Alternatively, the thin-film absorber may be part of a separate enclosure surrounding the absorber.

In the illustrated exemplary embodiment, an appropriate distance is maintained between the absorber and the glazing 206 by means of a frame 207. The frame 207 may be a solid material, a flexible foam, tubing, or other flexible material placed on or along the outside edges between the glazing 206 and the absorber. As noted above, the bag like structure formed by the layers 201, 203 and the permeable core 202 therein may be collectively referred to as the absorber.

In some exemplary embodiments, the frame 207 may not be necessary and is eliminated. For example, an alternative embodiment does not include any frame 207 as instead an adequate space between the absorber and glazing is created by the expansion upon warming of gasses trapped between the absorber and glazing in combination with the absorber outer surface contracting away from the glazing under the slight vacuum created by the suction pumps action.

In addition, the glazing layer 206 is optional and may be eliminated in some exemplary embodiments depending, for example, on climate and water temperature desired. For warmer climates and swimming pool heating applications, the glazing layer may not be desirable from a cost/benefits perspective such that not all exemplary embodiments include the glazing layer 206.

With continued reference to FIGS. 8 and 9, the solar thermal collector also includes thermally insulating material 208. The thermal insulating material 208 is attached to the inner absorber film 203, e.g., by using standard methods such as adhesive or mechanical means. The insulating material 208 may preferably be of a flexible nature, which would allow the entire device or solar thermal collector to be rolled up for shipping, storage, or transport. This flexibility would be especially attractive if the device or solar thermal collector were affixed to a rigid structure such as a roof. Alternatively, the insulating material 208 may instead be of a rigid variety that would aid in maintaining an appropriate flat shape for the solar thermal collector or device.

The insulating material 208 is optional depending on the configuration of the installation. In some exemplary embodiments, the insulating material 208 is not necessary and is eliminated, for example, when the solar thermal collector is installed with an insulating seal on a structure, such as a roof, that would provide sufficient or necessary insulating effect. This may be achieved, for example, by framing the solar thermal collector with a thermal insulator, such as extruded polystyrene, etc. In such exemplary embodiments, the glazing (e.g., if not attached directly to the solar thermal collector) may instead be held in an appropriate position relative to the solar thermal collector by the thermally insulating frame. The frame with the glazing may be affixed to a roof, wall, or other support structure. One or more gaskets may be affixed to the frame to help create an airtight space within the framed area housing the solar thermal collector.

A wide range of materials may be used for inner and outer absorber layers 201, 203, permeable core 202, and glazing 206. By way of example, the glazing 206 may be made of Tefzel® Ethylene TetrafluoroEthylene (ETFE) which has a high working temperature, clarity, resistance to UV degradation, ability to be heat sealed, and resistance to tearing. As another example, the glazing 206 may comprise Teflon® Fluorinated Ethylene Propylene (FEP). In addition, the inner and outer absorber layers or films 201 and 203 may also be made out of Tefzel® ETFE and/or Teflon® FEP. The outer layer 201 is preferably clear or transparent, while the inner layer 203 is dark colored or opaque (e.g., preferably black, etc.). As described earlier, a few layers of black high-density polyethylene netting, such as distributed by Smart Net as insect netting, woven polypropylene mesh, or high temperature nylon open cell foam are examples of good candidate materials for the permeable core 202. Alternative materials may also be used for the films 201, 203 and glazing 206 including other films, fluoropolymer films, etc.

FIG. 10 illustrates an exemplary embodiment of a solar thermal collector embodying one or more aspects of the present disclosure. This exemplary embodiment may be similar and/or have similar features to the example solar thermal collector shown in FIGS. 8 and 9. For example, the exemplary embodiment of the solar thermal collector shown in FIG. 10 includes two thin inner and outer film layers 301 and 303 (e.g., preferably polymer film, etc.) sealed together along all their edges (e.g., preferably heat sealed, etc.) to create a bag like structure that surrounds a permeable core 302. The solar thermal collector also includes glazing 306, a frame 307, and thermally insulating material 308. The same or similar materials described above may be used for the solar thermal collector shown in FIG. 10.

Also in this exemplary embodiment shown in FIG. 10, the solar thermal collector further includes a flap 309 attached to the glazing 306. The glazing 306 is also attached to the outer and inner layers 301, 303 along its perimeter using a method such as heat sealing. The flap 309 or alternately bands of material attached to the glazing 306 are preferably the same material that forms the glazing (e.g., Tefzel® Ethylene TetrafluoroEthylene (ETFE), Teflon® Fluorinated Ethylene Propylene (FEP), etc.).

The attachment point of the flap 309 to the glazing 306 is preferably located slightly away from the edge where the glazing 306 is attached to the outer layer 301. This will allow a space to be created between the glazing 306 and the outer layer 301 when the flap 309 is pulled up and away from the outer layer 301. The flap 309 passes over a riser 310. The flap 309 is also attached to the thermal insulation 308. This exemplary configuration is repeated on the other end of the collector.

After installing the inlet and outlet fittings and inserting mesh layer 302, the glazing 306 and the outer and inner layers 301, 303 may then be sealed together on both ends to complete the water tight collector enclosure. For example, FIG. 10 shows a combined portion 311 of the glazing 306 and outer and inner layers 301, 303 that are attached together and that extend together underneath the riser 310. The combined portion 311 may be attached and wrapped around the thermal insulation 308 as shown. Similarly, the combined portion 311 of the three layers 301, 303, 306 or some combination of the layers may be wrapped around the thermal insulation 308 and attached to the insulation 308 to keep the collector in place on the insulation 308. This would also serve to protect the edges of the thermal insulation 308 from the elements.

The sealing of the glazing 306 to the outer layer 301 adds to the thermal insulating effect of the glazing 306 by reducing the influx of cooler air below the glazing 306. Using a glazing layer 306 that is impermeable to gas allows a gas that had a lower heat transmission rate (e.g., Argon, etc.) to be blown in during construction. This would further improve the insulating effect of the glazing layer 306.

Figure 11:
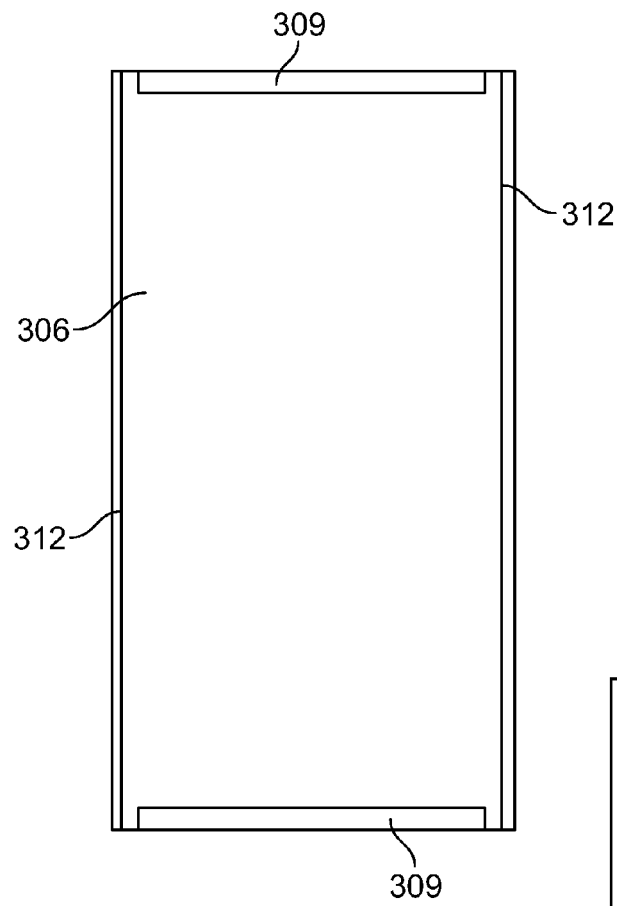
FIG. 11 is a top view of the solar thermal collector shown in FIG. 10 with seals along the long sides of the solar thermal collector according to an exemplary embodiment.

FIG. 11 is a top view of the solar thermal collector shown in FIG. 10 with seals 312 placed along the long sides of the solar thermal collector according to an exemplary embodiment. In FIG. 11, the seals 312 are shown approximately placed along the long sides of the collector. The flap 309 is also shown in FIG. 11.

Figure 12:
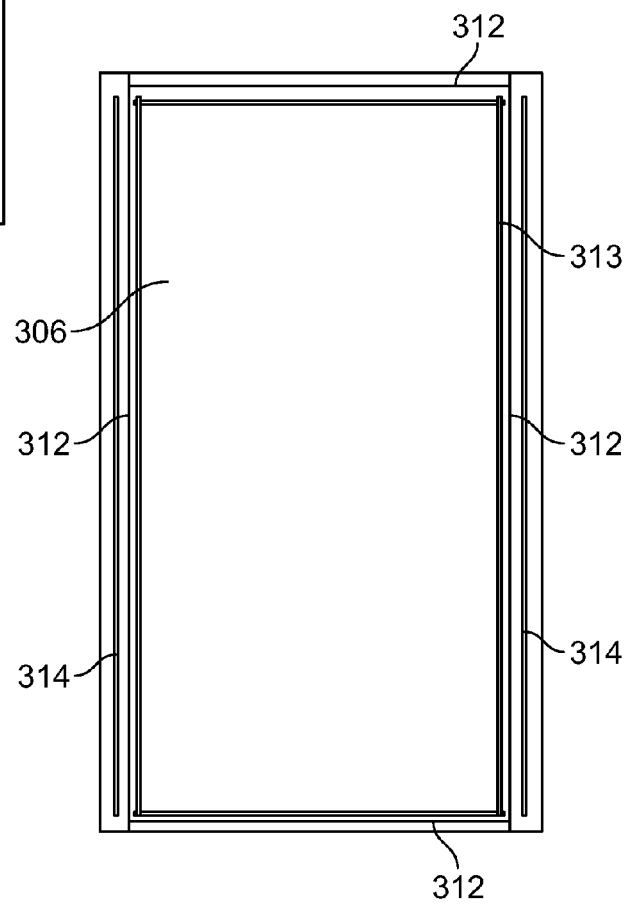
FIG. 12 is a top view of the solar thermal collector shown in FIG. 11 with an internal frame according to an exemplary embodiment.

FIG. 12 is a top view of the solar thermal collector shown in FIG. 11 with an internal frame 314 according to an exemplary embodiment. The glazing layer 306 with seals 312 are shown as they would be approximately placed along the long sides of the solar thermal collector.

FIG. 12 illustrates an exemplary means of keeping the glazing 306 at an appropriate distance from the absorber, which collectively includes the bag like structure defined by the outer and inner layers 301, 303 and the permeable (e.g., mesh, etc.) core 302 therein. In this exemplary embodiment, the internal frame 313 is within a sealed tube between the glazing layer 306 and the absorber. The internal frame 313 may be a solid material, flexible foam, tubing, or other flexible material.

The edges of the absorber and glazing layers 306 may be stretched in an exemplary manner that makes the glazing layer 306 taut. In an exemplary embodiment, the outside edges of the glazing 306 and absorber layers (e.g., 301, 302, 303 in FIG. 10, etc.) are sealed. This creates a tube into which may be inserted a support 313, such as a stiff wooden strip, etc. One of the supports 314 may be attached to either the back or front of the insulation. Then, the other support(s) 314 may be pulled and attached to the insulation in such as a manner as to make the glazing layer 306 taut. The support 314 allows the glazing layer 306 to be made taut smoothly along its length.

Disclosed herein are exemplary embodiments of a solar thermal collector having a unique all polymer design. The all polymer solar thermal collector may be configured either unglazed or glazed (e.g., include a glazing layer 206, 306, etc.). Exemplary embodiments of a solar thermal collector disclosed herein may provide or be associated with one or more (but not necessarily any or all) of the following advantages, such as durability, heat resistant, scale resistant, light weight, foldable, low manufacturing cost, scalable, freeze protected, stagnation protected, efficient, ability to directly heat potable water, overheat protection and/or ability to be run passively without a circulation pump.

With further regard to durability, exemplary embodiments of a solar thermal collector may be durable with a predicted 20+ year operating lifetime and able to withstand such hazards as hail storms. The durability is directly related to the polymers used. For example, the absorber and glazing layer may be made of Ethylene TetrafluoroEthylene (ETFE), which has a predicted 20+ year lifetime. The ability to withstand hail storms comes from the toughness of ETFE and the glazing being taut but with some give similar to a drum, which should allow hail to bounce off. The mesh or permeable core may be made of polytetrafluoroethylene (PTFE) coated fiberglass, which has an almost infinite lifetime.

With regard to heat resistant, a solar thermal collector may be configured to withstand temperatures of over 200° C. (392° F.). For example, ETFE and PTFE coated fiberglass can both withstand these temperatures. Thus, a solar thermal collector having an absorber and glazing layer made of ETFE and mesh made of PTFE coated fiberglass has good heat resistance with maximum predicted temperatures for "dry" stagnation (when no water at all is in the solar thermal collector) at about 235° F.

A solar thermal collector may be made out of materials disclosed herein that are highly resistant to scale buildup. For example, ETFE and mesh have low adhesion (Teflon family)

and so scale does not readily stick to it. Cross-linked polyethylene PEX piping may also be used, which is also more resistant to scale buildup than copper pipe. Accordingly, a solar thermal collector made out of such material would be scale resistant.

A solar thermal collector disclosed herein may be light weight. For example, a four feet by eight feet solar thermal collector panel may weigh less than twenty pounds when the solar thermal collector has an all polymer design. By having an all polymer design, the solar thermal collector is lighter weight than metal and glass collectors.

A solar thermal collector disclosed herein may be foldable or rollable, e.g., allow for UPS shipping, etc. For example, the mesh and absorber may be folded or rolled up without the glazing attached. Whether or not it is foldable with the glazing attached depends on the riser used to separate the glazing from the absorber. The glazing may be attached onsite or at a local assembly plant. Also, the solar thermal collector system may be completely foldable in exemplary embodiments in which the solar thermal collector includes foldable thermal insulation. Even if not foldable, a thermal insulation board may be attached at the same time as the glazing, e.g., onsite or at a local assembly plant, etc. Accordingly, the absorber may be foldable for shipping to a location at which the absorber is then unfolded before attaching the glazing and thermal insulation at the location.

A solar thermal collector disclosed herein may have a relatively low manufacturing cost. Part of the lower manufacturing cost is due to lower materials cost. Part of the lower manufacturing cost is also due to the manufacturing process, which is not overly complex and able to be done in a bulk process.

The size of a solar thermal collector disclosed herein is scalable and can be produced in very large sizes to fit any application. For example, the absorber portion can be cut to size as can the glazing and thermal insulation. This is unlike copper and glass designs, which are too heavy and unsupportable in larger sizes.

Also, a solar thermal collector disclosed herein may have a low profile. The very thin profile helps to create a more acceptable and aesthetic appearance.

A solar thermal collector disclosed herein may also be freeze protected such that solar thermal collector and feed pipes may be frozen solid with no adverse effects. For example, the collector can freeze because the absorber "bag like" structure can expand to accommodate the expansion of water. PEX piping has been shown to be freeze burst resistant when insulated and configured correctly. The solar thermal collector may also freeze and then start to work because the PEX piping that is exposed to freezing temperatures may be installed to be exposed to the sunlight and thawed thereby.

A solar thermal collector disclosed herein may also be stagnation protected with the ability to withstand long term wet or dry stagnation. High temperatures will not adversely affect an all polymer solar thermal collector, which is unlike copper collectors. The heat transfer fluid in most systems is glycol which breaks down when exposed to high temperatures. In the inventor's exemplary embodiments, water may be used as the heat transfer fluid, which will just boil when exposed to high temperatures.

A solar thermal collector disclosed herein may also be efficient or more efficient than other flat plate collectors. This increased efficiency is a result of the inventor's overall system design. In exemplary embodiments disclosed herein, the absorber is fully wetted such that the entire surface of the absorber is exposed to the heat transfer fluid. This is more efficient than other designs where the heat must be transferred from absorber fins to riser tubes. Also in exemplary embodiments disclosed herein, the inventor's solar thermal collector design is also back absorbing. This means that the sunlight strikes the same surface that the water is running over rather than striking the front where the heat would then have to pass through the material to the back where the heat transfer fluid is flowing. Accordingly, exemplary embodiments may also be referred to herein as fully wetted back absorbing collectors.

A solar thermal collector disclosed herein may also have the ability to directly heat potable water without the need for heat exchangers or draining in areas that experience freezing conditions. This is because the solar thermal collector can be exposed to freezing temperatures without harming the collector or pipes.

A solar thermal collector disclosed herein may also have overheat protection built into the design. For example, the inventor's system can remain exposed to sunlight without having to vent excess heat because the design allows water, which may be used as the heat transfer liquid medium, to boil within the solar thermal collector. The steam is pushed into the exit tube where it condenses. The solar thermal collector can then expand, but there will be no pressure build-up because the exit tube is designed to not be constricted as it terminates in an unpressurized holding tank that is vented. With overheat protection built into the design, the solar thermal collector and heat transfer fluid (e.g., plain water) are not damaged by either wet or dry stagnation. There is also no need to undersize the system to avoid overheating or to add heat dissipation units.

The combination of freeze protection and scale buildup resistance makes for a solar thermal collector that can offer something unique. For example, the solar thermal collector can directly heat potable water without the need for draining in areas that experience freezing conditions. This may make the system less complex, ease installation, improve reliability, reduce maintenance, and/or increases system efficiency. Because the system does not require or need heat exchangers, costs may be reduced and heat transfer may be increased.

A solar thermal collector system disclosed herein may be run passively, e.g., without a circulation pump. This may be made possible by four system design features in an exemplary embodiment. First, the system can remain filled with water without risk of freeze damage. Second, the system uses potable water so it directly uses the output from the collector, e.g., it is not in a closed loop with heat exchangers. Third, the storage tank is non-pressurized and vented. Fourth, frozen pipe will thaw because they are exposed to sunlight.

By configuring the collector system to be run passively without a circulation pump, this reduces cost and simplifies the system operation and installation while removing one of the components that would otherwise be most likely to breakdown in a solar thermal system, i.e., the circulation pump.

In addition to one or more collectors described herein, additional installation components may be installed in a standard installation. For example, a collector system may also include a differential thermostat (with pumped configuration), circulation pump (with pumped configuration), timer valve (with gravity flow configuration), constant pressure pump non-pressurized solar storage tank, tank insulation, PEX tubing, tempering valve, ball valve(s), and float valve(s).

Figure 13:
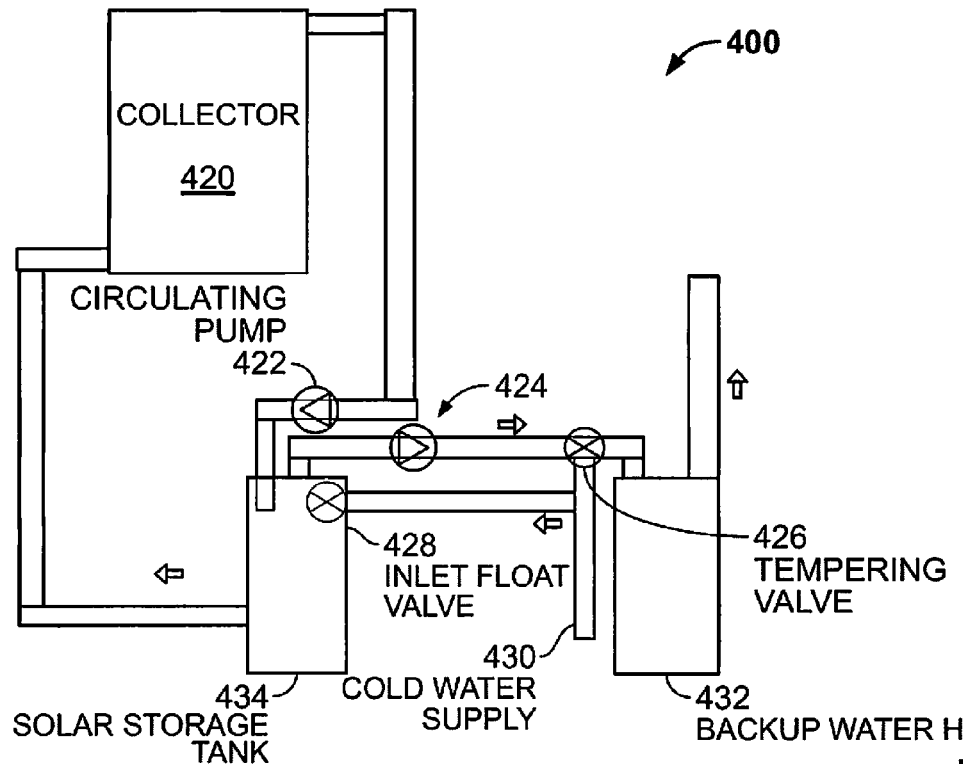
FIG. 13 is a schematic diagram of a "pumped" solar thermal collector system that includes a solar thermal collector and a circulation pump according to an exemplary embodiment.

FIG. 13 is a schematic diagram of a "pumped" solar thermal collector system 400 according to an exemplary embodiment. As shown, the system 400 includes a solar thermal collector 420. The collector 420 may be similar or identical to solar thermal collector disclosed herein (e.g., solar thermal collector shown in FIGS. 8-12, etc.). The system 400 also includes a circulating pump 422, a constant pressure pump 424, a tempering valve 426, an inlet float valve 428, a cold water supply 430, a backup water heater 432, and a solar storage tank 434.

Figure 14:
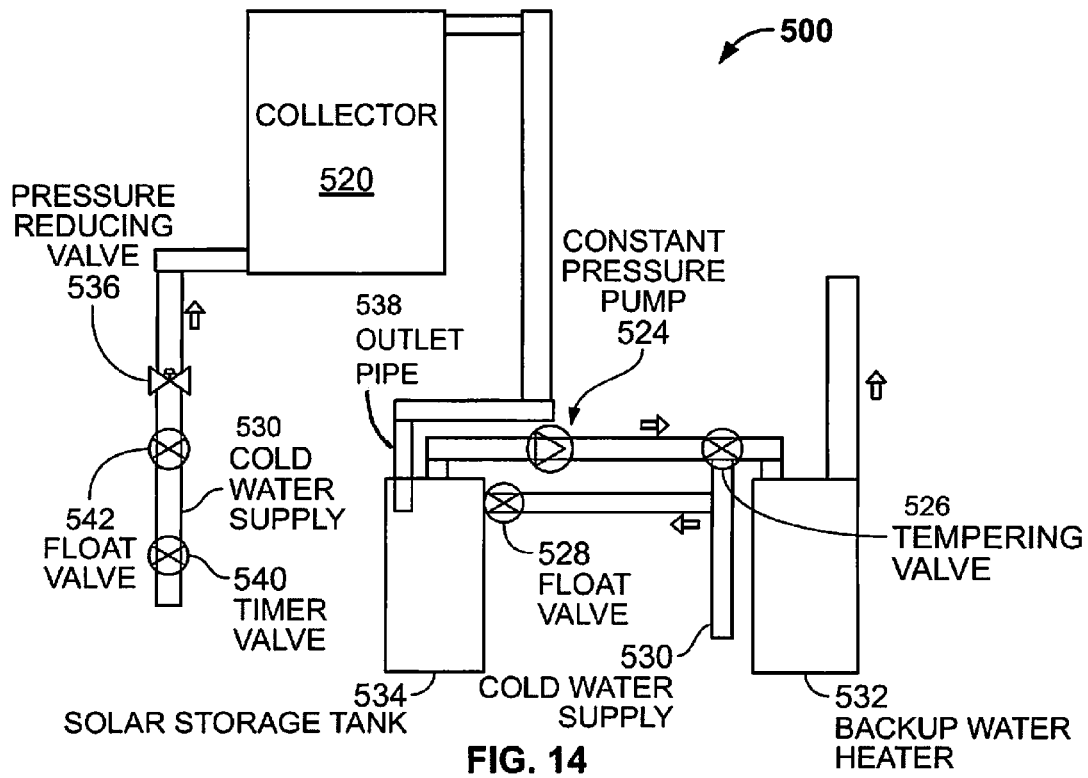
FIG. 14 is a schematic diagram of a "gravity flow" solar thermal collector system that includes a solar thermal collector without a circulation pump according to another exemplary embodiment.

FIG. 14 is a schematic diagram of a "gravity flow" solar thermal collector system 500 according to an exemplary embodiment. As shown, the system 500 includes a solar thermal collector 520. The collector 520 may be similar or identical to solar thermal collector disclosed herein (e.g., solar thermal collector shown in FIGS. 8-12, etc.). The system 500 includes a constant pressure pump 524, a tempering valve 526, an inlet float valve 528, a cold water supply 530, a backup water heater 532, and a solar storage tank 534. But the illustrated system 500 does not include a circulating pump.

As shown in FIG. 14, a pressure reducing valve 536 is situated before or downstream of the collector 520 in terms of heat transfer fluid flow. In this example, water is the heat transfer fluid. In operation, the pressure reducing valve 536 reduces the pressure of the water so that the water's natural height due to that pressure is above the storage tank inlet but below the collector 520. The solar storage tank 534 is unpressurized and open to the atmosphere. Once the system 500 is primed and water has been pulled through the collector 520 and through the outlet pipe 538 which drains into the solar storage tank 534, the water will flow by virtue of a gravity siphon being established.

The constant pressure pump 524 may be used to prime the system 500 by pulling water through the pipes (not shown in diagram). The constant pressure pump 524 may be permanently or temporary connected (via a shut-off valve) to the outlet pipe 538 This would allow the constant pressure pump 524 to exert additional suction force on the collector 520 and piping, which would serve to pull out any trapped air in the system 500. If the constant pressure pump 524 is permanently connected to the outlet pipe 538, the allowed flow from the solar storage tank 534 is balanced to allow additional suction force to be applied to the collector outlet pipe 538.

The end of the collector outlet pipe 538 terminates in the solar storage tank 534 and should be below the level of the water in the solar storage tank 534 to maintain the siphon. As shown in FIG. 14, adequate water may be maintained in the solar storage tank 534 with a valve 528, such as a float valve, that replenishes the water in the solar storage tank 534 if needed.

A valve to regulate the timing of the flow may be used to turn the flow off and on. For example, a simple timer valve 540 may be used that is set to go on and off at certain periods, such as when the Sun is hitting the collector 520. A valve (e.g., float valve 542, etc.) may also be used to regulate the flow rate of the water into the collector 520 so that the flow fills the solar storage tank 534 during the desired operating period.

The inlet and outlet fittings of the collector 520 allow the heat transfer fluid (e.g., water, etc.) to enter and exit the collector 520 into the inlet and outlet. The collector 520 may comprise a back absorber layer made from thin-film as previously described.

The water is preferably accessible to the inlet and outlet pipes without leaking around their edges as the pipes enter the collector 520. An exemplary way of achieving this and attachment of the fittings to the absorber layer is to use a fitting (e.g., fitting shown in FIGS. 15 and 16, etc.) that resembles a tank fitting and that is heat sealed to the absorber layer.

Figure 15:
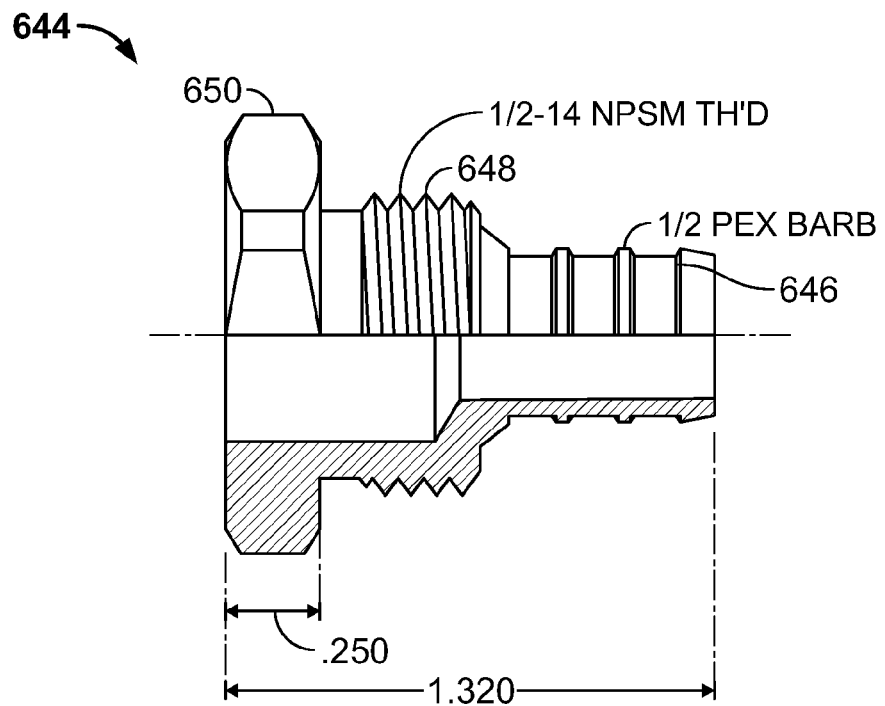
FIG. 15 is a sectional view of exemplary inlet and outlet fittings that may be used in a solar thermal collector where the dimensions are provided for purposes of illustration only according to an exemplary embodiment.
Figure 16:
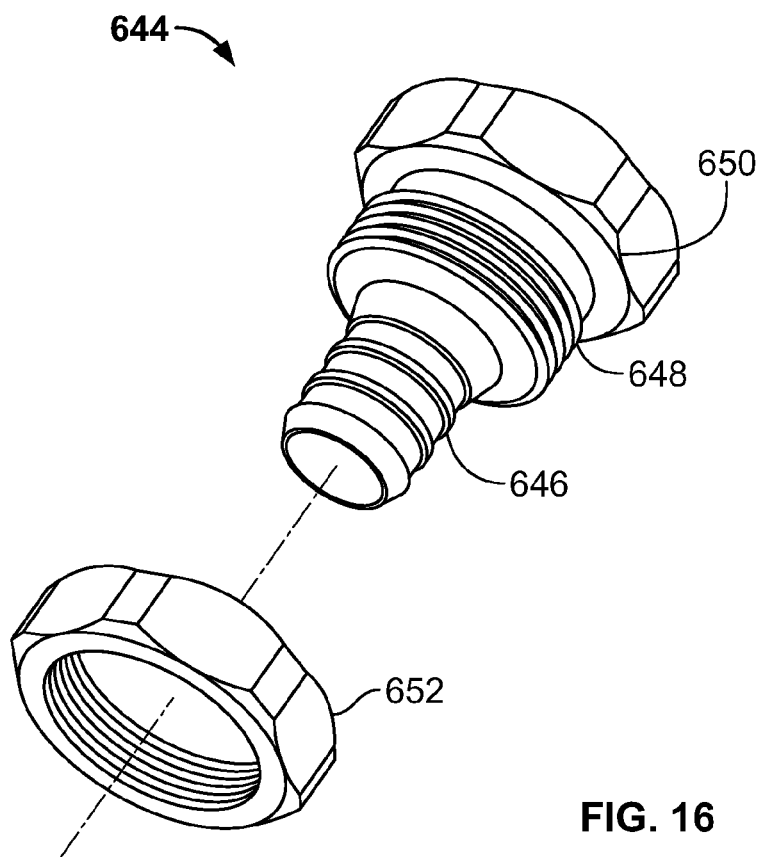
FIG. 16 is a perspective view of the exemplary inlet and outlet fittings shown in FIG. 15.

For example, FIGS. 15 and 16 illustrate exemplary inlet and outlet fittings that may be used with the solar thermal collector 520 shown in FIG. 14 or other solar thermal collector. The fitting 644 may be attached to a collector's absorber layer and also allow water to be accessible to the inlet and outlet pipes without leaking around their edges as the pipes enter the collector 520.

As shown in FIGS. 15 and 16, the fitting 644 includes a barbed end 646 with a threaded section 648 and a flange 650. An absorber film with an appropriately sized hole may be positioned against the flat face of the flange 650. The nut 652 can then be screwed onto the threaded section 648 such that the nut 652 also has one flat face against the absorber film. With the film in place in this exemplary manner, the fitting 644 may be heated to the melting point of the absorber film. Alternately, the fitting 644 may first be heated, and then the absorber film put in place and nut 652 tightened. After being cooled, the absorber film and fitting 644 may be laminated together forming a water-tight seal. In another exemplary embodiment of this fitting attachment, a heated flat surface of the fitting 644 may be pressed against the absorber layer to bond the fitting 644 to the absorber layer.

Figure 17:
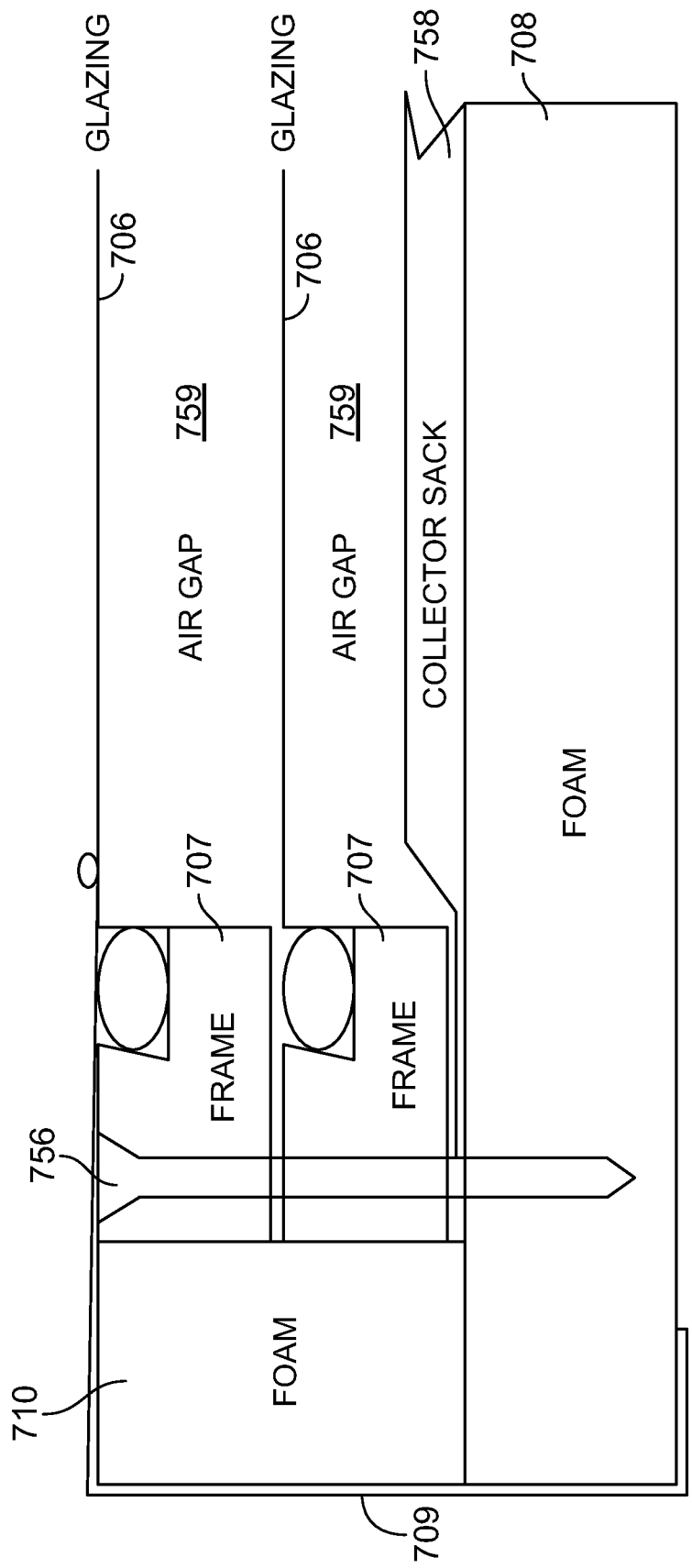
FIG. 17 is a side view of a solar thermal collector having glazing layers attached by frames and a spline according to an exemplary embodiment.

FIG. 17 illustrates a solar thermal collector having glazing layers 706 attached by frames 707 and a spline 756 according to an exemplary embodiment. In this exemplary embodiment, the solar thermal collector includes two glazing layers and thermally insulating air gaps 759. By way of example, the frames 707 may be similar to or identical to existing window screen frames. Alternative embodiments may have frames that are custom interlocking frame parts that allow multiple layers of glazing to be added. Still further exemplary embodiments may not include any spline as the glazing layers 706 may instead be attached differently, such as by using glue, other adhesives, etc.

The solar thermal collector shown in FIG. 17 may also include one or more additional features similar to features of the example solar thermal collector shown in FIG. 10. For example, the exemplary embodiment of the solar thermal collector shown in FIG. 17 may also include thin inner and outer film layers (e.g., preferably polymer film, etc.) sealed together along all their edges (e.g., preferably heat sealed, etc.) to form or define a collector sack or bag like structure 758. A permeable (e.g., mesh, etc.) core as disclosed above may be disposed within the collector sack 758. The solar thermal collector may also include thermal insulation 708 (e.g., foam, etc.), a flap 709 (e.g., flashing channel, etc.), and a riser 710 (e.g., foam, etc.).

Figure 18:
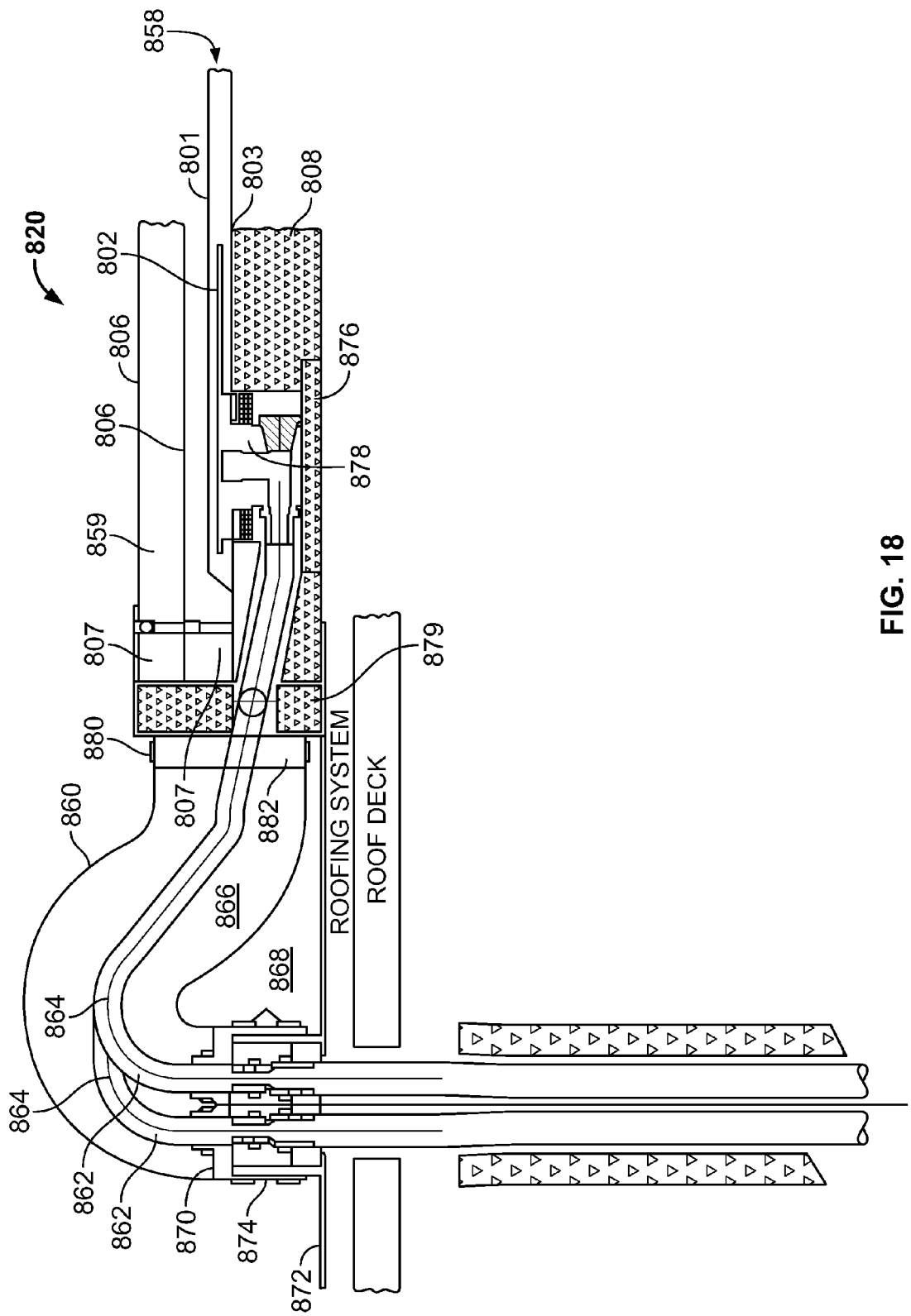
FIG. 18 is a side view of a roof-mounted solar thermal collector having an exemplary collector configuration for a rooftop installation according to an exemplary embodiment.

FIG. 18 illustrates a roof-mounted solar thermal collector 820 having an exemplary collector configuration for a rooftop installation according to an exemplary embodiment. As shown, the solar thermal collector 820 includes a clear tube 860 over the input and output lines 862. The input and output lines 862 are made of freeze burst resistant materials, such as silicone tubing, PEX tubing, etc. and are black in color. The input and output lines 862 may be able to freeze overnight, but will unfreeze when hit by sunlight. The clear tube 860 over the input and output lines 862 acts or operates as a glazing layer to add thermal insulation and speed the unfreezing.

The input and output lines 862 may comprise flexible ultraviolet (UV) resistant supply and return hoses. For example, the input and output lines 862 may comprise PEX tubing that is heat traced and insulated thru freezing unconditioned space. Internal copper wire heat conductors 864 may be disposed within the input and output hoses or lines 862. In operation, the conductors 864 extend the thawing and unfreezing regions of the input and output hoses 862 beyond where the sunlight will hit the hoses 862, such as by a distance of about six inches to about one foot.

The supply and return hoses 862 are separated from the clear tube 860 by an air gap 866, which operates as a thermal insulator. The clear tube 860 may comprise UV resistant transparent flexible compressible outer jacket that is spring coil reinforced.

Also shown in FIG. 18 are corrosion proof clamps 868, rubber cap 870 with bosses for clamps, special roof jack 872 flashed into the roofing, and a cylindrical boss 874 on the roof jack 872. These various components may be used as shown in FIG. 18 to attach or install the clear tube 860 and input and output lines 862 to the roof.

The solar thermal collector 820 includes stackable glazing frames 807 that allow multiple glazing layers 806 (e.g., transparent EFTE glazing, etc.) to be added and stacked, e.g., double, triple, quadruple glazing, etc. In this illustrated example, the solar thermal collector 820 includes two glazing layers 806 and thermally insulating air gaps 859.

The solar thermal collector 820 further includes mesh 802 (e.g., Teflon coated fiberglass mesh, etc.) within a collector sack 858. The collector sack or bag like structure 858 is formed or defined by thin outer and inner film layers 801, 803 (e.g., preferably polymer film, etc.) sealed together along all their edges (e.g., preferably heat sealed, etc.). The outer layer 801 may comprise a transparent EFTE glazing layer. The inner layer 803 may comprise a black opaque EFTE layer.

The solar thermal collector 820 further includes a thermal insulator 808. In this example, the thermal insulator 808 comprises thermally insulative foam sacking with precut tubing routes. A foam plug 876 is removable to allow access to an interior of the solar thermal collector 820. Inlet or outlet fitting 878 has multiple outlets to provide different options for supply or return tubing paths.

The supply and return lines 862 enter the solar thermal collector 820 through a hole in thermally insulative foam 879. The foam 879 is disposed about a perimeter or circumference of the hole, which allows routing to achieve common supply/return penetration thru the side end portion of the collector 820.

The clear tube 860 may be attached to the solar thermal collector 820 via a corrosion proof clamp 880 and field mountable collar 882 outside for common supply/return route. The collar 882 accepts the outer jacket sleeve of the clear tube 860. Then, the clamp 880 is tightened about the collar 882 to thereby clamp the collar 882 about the clear tube 860.

Exemplary embodiments may also include a sophisticated control system configured to measure the holding tank temperature and regulate the flow into the holding tank based on holding tank fill level, temperature, and previous values for time of day and heat flow rate. In operation, the control system helps optimize the flow into the holding tank to preferably capture as much heat as possible without going over our desired maximum temperature.

Exemplary embodiments may also have incorporated therein the feature of faster hot water delivery to faucets. By way of example, water may be pumped from the holding tank into a standard hot water heater, e.g., natural gas water heater. The water may be pumped to the standard hot water heater by a pump already used in the solar thermal collector system. The solar thermal collector system may also include a smart controller configured to monitor pump usage and predict, based on past usage habits, when to go on to circulate water in the hot water pipes.

Exemplary embodiments of solar thermal collectors and systems have been disclosed that may be used as hot liquid (e.g., water, etc.) solar thermal collector for medium and low temperature uses (e.g., domestic hot water, swimming pools, hot tubs, etc.). But aspects of the present disclosure may be used with other applications in addition to or besides solar water collectors. For example, exemplary embodiments of the inventor's solar absorbers or thermal collectors may also be used for water purification purposes, e.g., used as a water purifying device to heat water to a sufficiently high temperature for purification.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Or for example, the term "about" as used herein when modifying a quantity of an ingredient or reactant of the invention or employed refers to variation in the numerical quantity that can happen through typical measuring and handling procedures used, for example, when making concentrates or solutions in the real world through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A solar thermal collector comprising:
   a first layer comprising polymer and configured to allow sunlight to pass therethrough;
   a second layer comprising polymer and configured to absorb thermal energy from sunlight;
   a permeable core disposed between the first and second layers whereby a cavity is maintained between the first and second layers that allows fluid flow between the first and second layers;
   an inlet for allowing a heat transfer fluid to enter the solar thermal collector and flow through the permeable core within the cavity and in direct contact with the second layer, whereby thermal energy is transferrable from the permeable core and the second layer to the heat transfer fluid; and
   an outlet for allowing the heat transfer fluid to exit the solar thermal collector;
   wherein the second layer includes edges sealed to edges of the first layer to thereby form an impermeable and/or bag like structure that surrounds the permeable core.

2. The solar thermal collector of claim 1, further comprising one or more outer glazing layers configured to allow sunlight to pass therethrough.

3. The solar thermal collector of claim 2, wherein the first layer, the second layer, and the one or more outer glazing layers comprise thin-film polymers.

4. The solar thermal collector of claim 2, further comprising a frame along outside edges of the one or more outer glazing layers, wherein the frame is configured to maintain a distance of separation between the first layer and the one or more outer glazing layers.

5. The solar thermal collector of claim 4, wherein:
   the solar thermal collector further comprises one or more gaskets affixed to the frame to help create an airtight space within a framed area housing the solar thermal collector; and/or
   the first and second layers and the one or more outer glazing layers are sealed together on both ends to create a water tight collector enclosure.

6. The solar thermal collector of claim 2, wherein:
   the first and second layers and the one or more glazing layers comprise Ethylene TetrafluoroEthylene (ETFE) or Fluorinated Ethylene Propylene (FEP);
   the permeable core comprises one or more layers of polytetrafluoroethylene (PTFE) coated fiberglass mesh, black high-density polyethylene netting, woven polypropylene mesh, or high temperature nylon open cell foam;
   the permeable core is operable for causing flow turbulence in the heat transfer fluid flow as the heat transfer fluid flows through the permeable core within the cavity between the first and second layers; and
   the permeable core is operable to at least inhibit the first and second layers from collapsing together under suction and maintain the cavity between the first and second layers for the heat transfer fluid to flow.

7. The solar thermal collector of claim 2, further comprising thermal insulation attached to the second layer, wherein the first and second layers respectively define a top and a bottom of the cavity in which the permeable core is positioned and through which the heat transfer fluid flows.

8. The solar thermal collector of claim 1, wherein the edges of the second layer are heat sealed to the edges of the first layer.

9. The solar thermal collector of claim 1, wherein:
the first layer comprises a thin-film polymer having edges;
the second layer comprises a thin-film polymer having edges heat sealed to the edges of the thin-film polymer of the second layer to thereby form the impermeable and/or bag like structure in which the permeable core is positioned;
the inlet comprises an inlet tube that penetrates the impermeable and/or bag like structure into the cavity between the first and second layer, the inlet tube attached to the second layer by a fitting heat sealed to the second layer; and
the outlet comprises an outlet tube that penetrates the impermeable and/or bag like structure into the cavity between the first and second layer, the outlet tube attached to the second layer by a fitting heat sealed to the second layer.

10. The solar thermal collector of claim 1, wherein:
a suction pump is operable for pumping the heat transfer fluid through the solar thermal collector; and
the permeable core is operable to at least inhibit the first and second layers from collapsing together under suction and thereby provides a channel between the first and second layers for the heat transfer fluid to flow.

11. The solar thermal collector of claim 1, wherein:
the permeable core is operable to at least inhibit the first and second layers from collapsing together under suction and maintain the cavity between the first and second layers for the heat transfer fluid to flow; and/or
the permeable core comprises one or more layers of mesh operable for causing flow turbulence in the heat transfer fluid flow as the heat transfer fluid flows through the permeable core within the cavity between the first and second layers to aide in heating the heat transfer fluid.

12. The solar thermal collector of claim 1, wherein:
the first layer is clear, transparent, and/or light-transmissive;
the second layer is dark colored and/or opaque; and
the permeable core is dark colored and/or opaque.

13. The solar thermal collector of claim 1, wherein the solar thermal collector is made of only polymers.

14. The solar thermal collector of claim 1, wherein:
the solar thermal collector is made of only polymers approved for use with potable water;
the first and second layers are sealed together along all their perimeter edges such that the impermeable and/or bag like structure surrounding the permeable core is water tight;
the solar thermal collector is foldable into a first compact configuration and unfoldable into a second generally flat configuration for use to heat or pre-heat potable water;
the solar thermal collector is configured to withstand temperatures of over 200° C. (392° F.) and/or a maximum predicted temperature for dry stagnation at about 235° F.; and
the solar thermal collector is freeze burst resistant such that exposure to freezing temperature does not harm the solar thermal collector, whereby potable water may be circulated through the solar collector that is directly pumped or drawn through cross-linked polyethylene (PEX) piping from one or more holding tanks thereby eliminating a need for a heat exchanger.

15. A solar water heating system comprising the solar thermal collector of claim 1, a non-pressurized storage tank, and an outlet pipe from the solar collector that drains into the non-pressured storage tank, wherein the system is configured such that a gravity siphon is established after water has flowed through the solar thermal collector and through the outlet pipe, whereby the gravity siphon allows the solar water heating system to run passively without a circulation pump.

16. A solar water heating system comprising the solar thermal collector of claim 1, the system further comprising:
an input line for supplying water to be heated to the solar thermal collector;
an output line for returning heated water from the solar thermal collector; and
a clear tube over portions of the input and output lines that will be exposed to freezing temperatures and sunlight.

17. The system of claim 16, wherein:
the input and output lines are made of freeze burst resistant materials such that the input and output lines may freeze overnight and unfreeze when heated by sunlight;
the clear tube is operable as a glazing layer to add thermal insulation and speed the unfreezing of the input and output lines;
an air gap separates the input and output lines from the clear tube, which air gap is operable as a thermal insulator for the input and output lines; and
internal heat conductors are disposed within the input and output lines, whereby the internal heat conductors are operable for extending thawing regions of the input and output hoses beyond where sunlight hits the input and output lines.

18. The solar thermal collector of claim 1, wherein:
the first and second layers are sealed together along all their perimeter edges such that the impermeable and/or bag like structure surrounding the permeable core is water tight;
the heat transfer fluid is a heat transfer liquid; and
the solar thermal collector is configured to allow the heat transfer fluid liquid to enter the solar thermal collector, flow through the permeable core within the cavity, and directly contact the first and second layers.

19. A solar thermal collector comprising:
a first layer comprising polymer and configured to allow sunlight to pass therethrough;
a second layer comprising polymer and configured to absorb thermal energy from sunlight, the second layer including edges sealed to edges of the first layer;
a permeable core disposed between the first and second layers whereby a cavity is maintained between the first and second layers that allows fluid flow between the first and second layers; and
an inlet for allowing a heat transfer fluid to enter the solar thermal collector and flow through the permeable core and in direct contact with the second layer, whereby thermal energy is transferrable from the permeable core and the second layer to the heat transfer fluid;
an outlet for allowing the heat transfer fluid to exit the solar thermal collector;
one or more outer glazing layers configured to allow sunlight to pass therethrough; and
thermal insulation attached to the second layer; wherein:
the one or more glazing layers includes edges heat sealed to the first layer along a perimeter of the one or more glazing layers;

a flap is attached to the one or more glazing layers at a location adjacent but slightly away from one of the edges of the one or more glazing layers heat sealed to the first layer;
the flap is also attached to the thermal insulation; and
a riser over which the flap passes.

20. A solar thermal collector comprising:
a first layer comprising polymer and configured to allow sunlight to pass therethrough;
a second layer comprising polymer and configured to absorb thermal energy from sunlight, the second layer including edges sealed to edges of the first layer;
a permeable core disposed between the first and second layers whereby a cavity is maintained between the first and second layers that allows fluid flow between the first and second layers; and
an inlet for allowing a heat transfer fluid to enter the solar thermal collector and flow through the permeable core and in direct contact with the second layer, whereby thermal energy is transferrable from the permeable core and the second layer to the heat transfer fluid;
an outlet for allowing the heat transfer fluid to exit the solar thermal collector;
one or more outer glazing layers configured to allow sunlight to pass therethrough; and
thermal insulation attached to the second layer; wherein:
outside edges of the one or more glazing layers and first and second layers are sealed thereby creating tubes along the outside edges into which are positioned supports; and
the supports are attached to the thermal insulation in such a manner as to make the one or more glazing layers taut.

* * * * *